United States Patent
Gong et al.

(10) Patent No.: US 9,919,974 B2
(45) Date of Patent: Mar. 20, 2018

(54) HIGH-STRENGTH GEOPOLYMER COMPOSITE CELLULAR CONCRETE

(71) Applicant: The Catholic University of America, Washington, DC (US)

(72) Inventors: Weiliang Gong, Rockville, MD (US); Werner Lutze, Chevy Chase, MD (US); Ian L. Pegg, Alexandria, VA (US)

(73) Assignee: The Catholic University of America, Washington, DC (US)

( * ) Notice: Subject to any disclaimer, the term of this patent is extended or adjusted under 35 U.S.C. 154(b) by 183 days.

(21) Appl. No.: 14/193,001

(22) Filed: Feb. 28, 2014

(65) Prior Publication Data

US 2014/0264140 A1   Sep. 18, 2014

Related U.S. Application Data

(60) Provisional application No. 61/781,885, filed on Mar. 14, 2013.

(51) Int. Cl.
*C04B 12/00* (2006.01)
*C04B 38/02* (2006.01)

(52) U.S. Cl.
CPC ............ *C04B 38/02* (2013.01); *Y02P 40/165* (2015.11); *Y02W 30/92* (2015.05); *Y02W 30/94* (2015.05); *Y02W 30/95* (2015.05)

(58) Field of Classification Search
CPC .............................. C04B 12/005; C04B 38/02
USPC ........................................................ 106/705
See application file for complete search history.

(56) References Cited

U.S. PATENT DOCUMENTS

| | | | |
|---|---|---|---|
| 5,488,991 A * | 2/1996 | Cowan | C04B 24/243 106/696 |
| 5,605,570 A | 2/1997 | Bean et al. | |
| 8,202,362 B2 | 6/2012 | Davidovits et al. | |
| 2007/0144407 A1* | 6/2007 | Biscan et al. | 106/819 |
| 2010/0058957 A1 | 3/2010 | Boxley | |
| 2011/0034572 A1* | 2/2011 | Mueller | 521/68 |
| 2011/0203489 A1* | 8/2011 | Constantz et al. | 106/817 |

(Continued)

FOREIGN PATENT DOCUMENTS

| | | |
|---|---|---|
| JP | 2011219281 A * | 11/2011 |
| WO | WO 2011003918 A1 * | 1/2011 |
| WO | 2012/069024 A2 | 5/2012 |

OTHER PUBLICATIONS

Bell, J.L.; Kriven, W.M. "Preparation of Ceramic Foams from Metakaolin Based Geopolymer Gels". Geopolymers. Developments in Strategic Material. Apr. 2009. Retrieved from http://onlinelibrary.wiley.com/doi/10.1002/9780470456200.ch10/pdf.*

(Continued)

*Primary Examiner* — Helene Klemanski
(74) *Attorney, Agent, or Firm* — Ajay A. Jagtiani; Miles & Stockbridge P.C.

(57) ABSTRACT

A composite binder comprises: one or more Class F fly ash materials, one or more gelation enhancers, and one or more hardening enhancers, wherein each of the one or more Class F fly ash materials comprises 15 wt. % or less calcium oxide, and wherein the composite binder is a Portland cement-free binder for concrete. Also provided are Geopolymer Composite Cellular Concretes (GCCCs) including the composite binder and methods of making these GCCCs.

105 Claims, 3 Drawing Sheets

(56) References Cited

U.S. PATENT DOCUMENTS

| | | |
|---|---|---|
| 2011/0271876 A1 | 11/2011 | Alter et al. |
| 2012/0024196 A1 | 2/2012 | Gong et al. |
| 2012/0152153 A1* | 6/2012 | Gong .................... C04B 28/006 106/705 |
| 2012/0172469 A1 | 7/2012 | Perez-Pena |

OTHER PUBLICATIONS

Siddique, R.; Khan, Iqbal M. "Supplementary Cementing Materials". 2011. pp. 67-68.*

Natali, A.; Manzi, S.; Bignozzi, M.C. "Novel fiber-reinforced composite materials based on sustainable geopolymer matrix". Procedia Engineering. 2011. pp. 1124-1131.*

Davidovits, Joseph. "Geopolymer Chemistry and Applications". 2nd ed. pp. 177-178, 2002.*

International Search Report and Written Opinion received in corresponding PCT Application No. PCT/IB2014/059599 dated Aug. 28, 2014.

Esmaily, H. and H. Nuranian, Non-autoclaved high strength cellular concrete from alkali activated slag, Construction and Building Materials, 26 (1), 200-206 (2012).

Vlček, J., H. Eleková, V. Tomková, V. Matěkja, and F. Ovčačik, Lightweight materials based on slag from production of iron and steel (published on-line) (2010).

Aguilar, R.A., O.B. Díaz, J.I. Escalante García, Lightweight concretes of activated metakaolin-fly ash binders, with blast furnace slag aggregates, Construction and Building Materials, 24 (7), 1166-1175 (2010).

Joseph Henon, J., A. Alzina, J. Absi, D.S. Smith, and S. Rossignol, Potassium geopolymer foams made with silica fume pore forming agent for thermal insulation, Journal of Porous Materials, 20(1), 37-46 (2013).

Print-out of http://amicancellularconcrete.com/.

Jones et al., "Preliminary views on the potential of foamed concrete as a structural material", Magazine of Concrete Research, vol. 57, No. 1, pp. 21-31 (2005).

Kearsley et al., "The effect of high fly ash content on the compressive strength of foamed concrete", Cement and Concrete Research, vol. 31, pp. 105-112 (2001).

Narayanan et al., "Structure and properties of aerated concrete: a review", Cement and Concrete Composites, vol. 22, pp. 321-329 (2000).

Nyale et al., "Synthesis and characterization of coal fly ash-based foamed geopolymer", Procedia Environmental Sciences, vol. 18, pp. 722-730 (2013).

E. Prud'homme et al., "Silica fume as porogent agent in geomaterials at low temperature", Journal of the European Ceramic Society, vol. 30, pp. 1641-1648 (2010).

Ramamurthy et al., "A classification of studies on properties of foam concrete", Cement and Concrete Compositions, vol. 31, pp. 388-396 (2009).

Rickard et al., "Performance of solid and cellular structured fly ash geopolymers exposed to a simulated tire", Cement and Concrete Compositions, pp. 1-8 (2013).

Rickard et al., "Performance of fibre reinfoced, low density metakaolin geopolymers under simulated tire conditions", Applied Clay Science, vol. 73, pp. 71-77 (2013).

McCormick, "Rational Proportioning of Preformed Foam Cellular Concrete", ACI Journal, Title No. 64-10, pp. 104-110 (1967).

Kunhanandan et al., "Models relating mixture composition to the density and strength of foam concrete using response surface methodology", ScienceDirect, Cement and Concrete Composites, No. 28, pp. 752-760 (2006).

Kearsley et al., "Reinforced Foamed Concrete—Can It Be Durable?", Concrete Beton, Issue No. 91; ISSN: 0379-9824; pp. 5-9 (1998).

Aguilar et al., "Lightweight concretes of activated metakaolin-fly ash binders, with blast furnace slag aggregates", Construction and Building Materials, vol. 24, pp. 1166-1175 (2010).

Extended European Search Report received in European Application No. 14762280.7, dated Oct. 14, 2016.

* cited by examiner

HIGH-STRENGTH GEOPOLYMER COMPOSITE CELLULAR CONCRETE

CROSS-REFERENCE TO RELATED APPLICATIONS

This application claims benefit of priority to U.S. Provisional Patent Application No. 61/781,885 entitled "GEOPOLYMER CELLULAR CONCRETE," filed Mar. 14, 2013 which is incorporated by reference in its entirety.

BACKGROUND

Field of the Invention

This invention relates generally to methods of high strength low-density geopolymer composite cellular concrete compositions (GCCCs).

Related Art

There is a growing need to develop, green, low cost, non-autoclaving processes to manufacture high strength lightweight cellular concrete for both thermal insulation and structural applications.

SUMMARY

According to a first broad aspect, the present invention provides a product comprising: a composite binder comprising: one or more Class F fly ash materials, one or more gelation enhancers, and one or more hardening enhancers, wherein each of the one or more Class F fly ash materials comprises 15 wt. % or less calcium oxide, and wherein the composite binder is a Portland cement-free binder for concrete.

According to a second broad aspect, the present invention provides a method comprising the following steps: (a) mixing together one or more Class F fly ash materials, one or more gelation enhancers and one or more hardening enhancers to thereby form a composite binder, (b) mixing the composite binder with one or more alkaline activators to thereby form an activated mixture, (c) mixing the activated mixture with one or more aggregates to thereby form a concrete mixture, (d) mixing the concrete mixture with one or more foaming agents to thereby form a geopolymer composite cellular concrete mixture, (e) pouring the geopolymer composite cellular concrete mixture into a mold, and (f) maintaining the geopolymer composite cellular concrete mixture in the mold at a temperature of at least room temperature to thereby allow the geopolymer composite cellular concrete mixture to foam, expand, set, harden and cure and thereby form a geopolymer composite cellular concrete product, wherein each of the one or more Class F fly ash materials comprises 15 wt. % or less calcium oxide.

According to a third broad aspect, the present invention provides a method comprising the following steps: (a) mixing together one or more Class F fly ash materials, one or more gelation enhancers and/or one or more hardening enhancers to thereby form a composite binder, (b) mixing the composite binder with one or more alkaline activators to thereby form an activated mixture, (c) mixing the activated mixture with one or more foaming agents to thereby form a geopolymer composite cellular concrete mixture, (d) pouring the geopolymer composite cellular concrete mixture into a mold, and (e) maintaining the geopolymer composite cellular concrete mixture in the mold at a temperature of at least room temperature to thereby allow the geopolymer composite cellular concrete mixture to foam, expand, set, harden and cure and thereby form a geopolymer composite cellular concrete product, wherein each of the one or more Class F fly ash materials comprises 15 wt. % or less calcium oxide, and wherein the geopolymer composite cellular concrete product has an apparent density of about 400 kg/m$^3$ to about 1200 kg/m$^3$ and a 28-day compressive strength of about 3 to about 17 MPa.

According to a fourth broad aspect, the present invention provides a method comprising the following steps: (a) mixing together one or more Class F fly ash materials, one or more gelation enhancers and/or one or more hardening enhancers to thereby form a composite binder, (b) mixing the composite binder with one or more alkaline activators to thereby form an activated mixture, (c) mixing the activated mixture with one or more foaming agents to thereby form a geopolymer composite cellular concrete mixture, (d) pouring the geopolymer composite cellular concrete mixture into a mold, and (e) maintaining the geopolymer composite cellular concrete mixture in the mold at a temperature of at least room temperature to thereby allow the geopolymer composite cellular concrete mixture to foam, expand, set, harden and cure and thereby form a geopolymer composite cellular concrete product, wherein each of the one or more Class F fly ash materials comprises 15 wt. % or less calcium oxide, and wherein the geopolymer composite cellular concrete product has an apparent density of about 1200 kg/m$^3$ to about 1800 kg/m$^3$ and a 28-day compressive strength of at least 17 MPa.

DETAILED DESCRIPTION OF THE PREFERRED EMBODIMENTS

Definitions

Figure 1:
FIG. 1 is a photo of a geopolymer composite cellular concrete for structural application showing homogeneous cellular structure.
Figure 2:
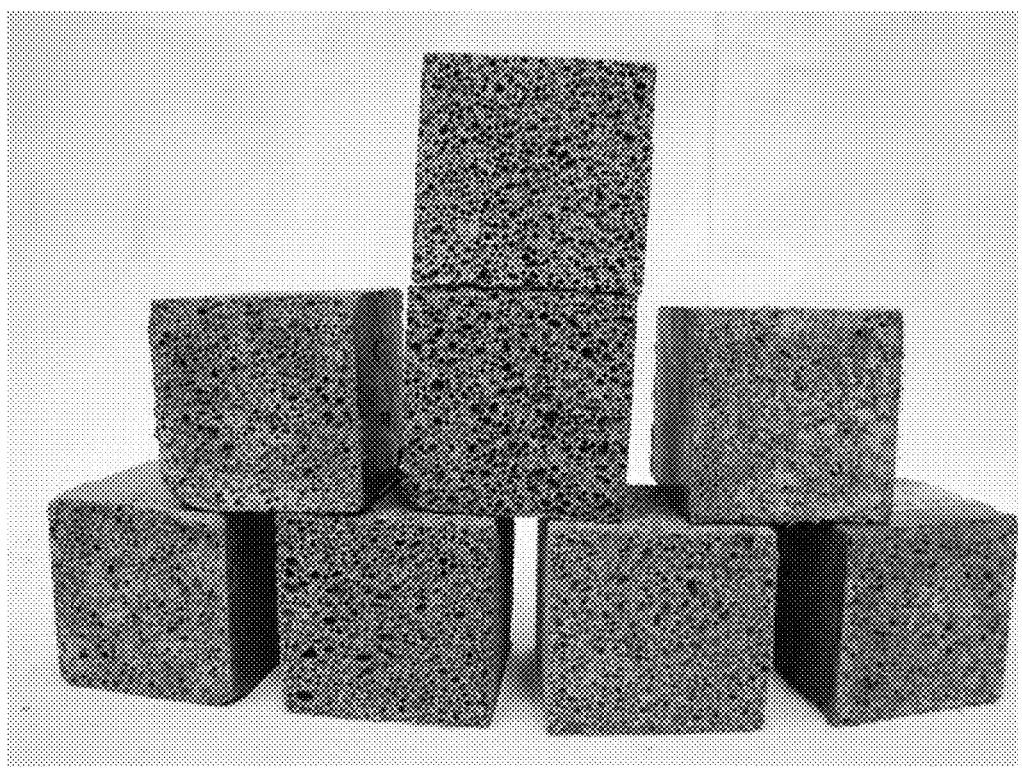
FIG. 2 is a photo of a geopolymer composite cellular concrete for thermal insulation showing homogeneous cellular structure.

Where the definition of terms departs from the commonly used meaning of the term, applicant intends to utilize the definitions provided below, unless specifically indicated.

For purposes of the present invention, the term "low alkali-earth oxide content" refers to pozzolans with less than 15 wt. % CaO+MgO.

For purposes of the present invention, the term "high dissolution rate in alkaline solution" refers to certain pozzolanic materials which have a high reactivity in an alkaline solution, e.g., at an apparent rate constant of more than $10^{-2}$ to $10^{-3}$ hour$^{-1}$ at ambient temperatures.

For purposes of the present invention, the term "binder for concrete" refers to a binder material or cementitious material (non Portland cement) that may be mixed with an air or solid lightweight aggregate material to form a hardened material.

For purposes of the present invention, the term "Class C fly ash" refers to "Class C fly ash" as defined by the American society for Testing and Materials (ASTM C618).

For purposes of the present invention, the term "Class F fly ash" refers to "Class F fly ash" as defined by the American society for Testing and Materials (ASTM C618).

For purposes of the present invention, the term "coarse aggregate" and the term "coarse aggregate material" refer to a coarse aggregate as defined by the American society for Testing and Materials (ASTM C33). Examples of coarse aggregates include: granite, metamorphic, limestone etc.

For the purposes of present invention, the term "coarse lightweight aggregate" is referred to a coarse lightweight aggregate as defined by the American society for Testing and Materials (ASTM C332 and C330 for insulating and structural concretes, respectively).

For purposes of the present invention, the term "fine aggregate" refers to an aggregate as defined by the American society for Testing and Materials (ASTM C33). Examples of fine aggregates include masonry sand and calcined bauxite sand. A fine lightweight aggregate is a fine aggregate that is also lightweight as defined by the American society for Testing and Materials (ASTM C332 and C330 for insulating and structural concretes, respectively).

For purposes of the present invention, the term "foaming agent" refers to materials that may be used to introduce or generate foam in fresh concrete. Examples of foaming agents include aluminum powder, hydrogen peroxide, alkali peroxides, alkali perborate, etc.

For purposes of the present invention, the term "highly reactive aluminosilicates" refers to pozzolanic materials, which are low in alkali-earth oxide (e.g., less than 5 wt. %) and are able to dissolve very quickly in alkaline solution at ambient temperatures, e.g., at apparent rate constant of more than $10^{-2}$ $hour^{-1}$._. An example of a highly reactive aluminosilicate is metakaolin.

For purposes of the present invention, the term "ground granulated blast-furnace slag" refers to the material as defined by American society for Testing and Materials (ASTM C989). The furnace slag is usually produced by quenching molten iron slag from a blast furnace in water or steam to form a glassy granular product and then drying and grinding the glassy into a fine powder.

For purposes of the present invention, the term "lightweight aggregate" refers to any aggregate having a density of 50 $kg/m^3$ to about 1000 $kg/m^3$.

For purposes of the present invention, the term "low calcium Class F fly ash" refers to Class F fly ash having a calcium content of less than 8 wt. % or less than 15 wt. %.

For purposes of the present invention, the term "Portland cement-free binder" refers to a binder composition that does not contain Portland cement.

For purposes of the present invention, the term "reactive amorphous alkali-earth aluminosilicate" refers to the pozzolanic materials containing alkali-earth oxides (CaO+ MgO) more than 15 wt. %. Examples of reactive amorphous alkali-earth almuninosilicates include ground granulated blast-furnace slag, vitreous calcium silicate, Class C fly ash, etc.

For purposes of the present invention, the term "silica fume" and "microsilica" refers to the conventional meaning, i.e., an amorphous (non-crystalline) form of silica (silicon dioxide) with a particle size less than 0.1 µm.

For purposes of the present invention, the term "submicron" refers to particles that are less than 1 µm in diameter.

For purposes of the present invention, the term "ultrafine" refers to particles that are less than or equal to about 15 µm in diameter.

description

Conventional Cellular Concrete is a versatile, lightweight, building material. Other names frequently used in the literature are aerated concrete, aircrete, and foamed concrete. Cellular concrete can be made with a wide range of densities and compressive strength and it is used for many different applications. In many cases cellular concrete can provide cost and performance benefits when compared with traditional building materials. Essentially, the basic definition of cellular concrete is that "it is mortar or mortar-like material with discrete air bubbles in it." The air content of conventional cellular concrete may be up to 85% by volume. It can have a range of dry densities typically from 400 $kg/m^3$ (25 $lbs/ft^3$) to 1600 $kg/m^3$ (100 $lbs/ft^3$) with compressive strength between 1 to 15 MPa. Generally the cellular concrete offers a number of benefits such as generally lower in cost than alternative load-reducing materials, relatively high compressive strength in relation to its weight, absorption of shock waves, high thermal insulation due to content of up to 85 vol. % air, and high fire resistance (cellular concrete is approximately twice as fire resistant as dense concrete.

A large number of proprietary methods and agents are used to make cellular concrete but essentially they can be divided into two groups: those using a chemical reaction and those relying on mix foaming to entrain air into the concrete. The lightweight concrete made by gasification from a chemical reaction is called in this patent application aerated concrete or Aerated Cellular Concrete (ACC). Since this process usually employs an autoclave, it is also called Autoclaved Cellular Concrete (ACC). The lightweight concrete made by using aqueous foams is called foamed concrete or aircrete. The foamed concrete derived from aqueous foams is typically proportioned to achieve only low compressive strengths as compared to ACC and only suitable for use in void fill and trench reinstatement, and thus the material is largely disregarded for use in weight-bearing and structural applications.

In a typical ACC manufacturing process, quartz sand or fly ash, lime, cement, aluminum powder, and water are mixed together. During mixing, the lime reacts with the water to form calcium hydroxide, and heat is generated. When the mix is cast in forms, the aluminum powder, reacting with calcium hydroxide and water generates hydrogen, expands or foams the concrete mix to about twice its original volume or more. After expansion has occurred the porous mass is cut to a desired size and shape and is placed in an autoclave filled with pressurized steam. The autoclaving process lasts typically 10-12 hours with temperature of 180-200° C. and the pressure reaching 12 bars. The ACC process is more suitable for precast plants than for use in the field. Production is associated with relatively large initial capital investment in equipment and facility and operation costs. There has been a worldwide increase in the use of AAC materials and new production plants are being built in Eastern Europe, Israel, China, Bahrain, India, and Australia. Most of the attempts over the last few decades to introduce AAC to the US hardly made a significant impact on the construction industry. The tens of millions of dollars of initial capital investment needed to make AAC compared with a conventional precast plant is justan important reason for failure as reported in the literature. The abundance of inexpensive wood products in the United States explains the lack of incentive for the development of new building technologies.

The autoclaved cellular concrete uses significant amounts of Portland cement and lime (calcium hydroxide). It is well known that production of Portland cement and lime emits carbon dioxide, which contributes to global warming. High temperature/pressure autoclaving is an energy-intensive process.

Foresight groups around the world have identified the future need for construction materials that are light, durable, and simple to use, economic, yet green and environmentally sustainable. A low temperature process to manufacture high strength cellular concrete is desirable.

In the past decades, the potential of geopolymers has been explored as a substitute for Portland cement. Geopolymer is a term used to describe inorganic polymers based on aluminosilicate, which can be produced by reacting pozzolanic compounds, i.e., aluminosilicate source materials, with highly alkaline solutions. Geopolymers consist of silicon and aluminum atoms bonded via oxygen atoms into a polymer network. Charge balance is provided by alkali ions. Geopolymers are prepared by dissolution and subsequent poly-condensation reactions between a reactive aluminosilicate material and an alkaline silicate solution, such as a mixture of an alkali metal silicate and metal hydroxide. Examples of a reactive aluminosilicate material are industrial by-products such as Class F fly ash (FFA), Class C fly ash (CFA) and ground granulated blast furnace slag (BFS). The reactive aluminosilicate source can also be a natural mineral such as kaolinite, clay, zeolite and volcanic ash. Thus geopolymers are essentially 'green and sustainable'.

U.S. Pat. No. 5,605,570 (Reference 5) describes a foamed geopolymer material made from blast furnace slag. Sodium peroxide acts as the foaming agent and the alkaline activator. Sodium peroxide reacts with water to produce a sodium hydroxide solution that activates the slag to form the geopolymer and oxygen gas develops to induce volume expansion. Sodium peroxide is expensive and therefore, the process is economically not viable.

Esmaily and Nuranian (2012) (Reference 1) have used aluminum powder and/or an organic foaming agent to prepare lightweight materials from furnace slag activated by sodium silicate solution.

Vlcek et al. (2010) (Reference 2) have studied the effect of fly ash addition on properties of lightweight geopolymer materials based on alkali activated iron and steel slag using aluminum powder as the foaming agent.

Augilar et al. (2010) (Reference 3) have reported a lightweight concrete made of alkali activated metakaolin-flyash binder. Aluminum powder was used as the foaming agent. Blast furnace slag sands were used as aggregates.

Henon et al. (2013) (Reference 4) have published a method to prepare metakaolin-based geopolymer foams made with silica fume as the pore-forming agent. Silica fume, a waste product from the Si—Fe metallurgy, contains usually less than 1 wt. % silicon. Silicon is a foaming agent when it reacts with alkali hydroxide solution giving off hydrogen. Large amounts of silica fume are needed and the foaming process requires stimulation at elevated temperature.

Fly ash is a fine powder byproduct formed during combustion of pulverized coal in electrical power plants. The American Society for Testing and Materials (ASTM) C618 standard recognizes two major classes of fly ashes for use in concrete: Class C and Class F. The lower limit of $SiO_2 + Al_2O_3 + Fe_2O_3$ for Class F fly ash is 70% and that for Class C fly ash is 50%. Class F fly ashes generally have a calcium oxide content of about 15 wt. % or less, whereas Class C fly ashes generally have a higher calcium oxide content (e.g., 20 to 40 wt. %). High calcium oxide content makes Class C fly ashes possess cementitious properties leading to the formation of calcium silicate and calcium aluminate hydrates when mixed with water.

Ground granulated blast furnace slag (GGBFS) is a glassy granular material that varies, from a coarse, popcorn-like friable structure to greater dense, sand-size grains. Grinding reduces the particle size to cement fineness, allowing its use as a supplementary cementitious material in Portland cement-based concrete. Typical ground granulated blast furnace slag includes 27-38% $SiO_2$, 7-12% $Al_2O_3$, 34-43% CaO, 7-15% MgO, 0.2-1.6% $Fe_2O_3$, 0.15-0.76% MnO and 1.0-1.9% by weight. Since GGBFS is almost 100% glassy (amorphous), it is much more reactive than Class F fly ashes. The higher proportion of the strength-enhancing calcium silicate hydrate (CSH) than in Portland cement results in higher ultimate strength than concrete made only with Portland cement.

Challenges associated with the use of ground granulated furnace slag and Class C fly ashes in geopolymers include difficult control of setting during alkali activation and large shrinkage of the final products.

One particular challenge is that the geopolymer paste made with Class F fly ash sets and hardens very slowly and usually has low final strength, particularly when cured at low temperatures (e.g., room temperature).

To overcome this and other challenges, the present inventors have developed new Geopolymer Composite Cellular Concretes (GCCCs) that reach high final strength, even when cured at room temperature. At the same time these geopolymer composites exhibit optimal rheological properties for stabilizing the cellular structure and exhibit a sufficiently long set time to allow desirable volumetric expansion. In one embodiment, the present invention provides compositions and methods of high strength Geopolymer Composite Cellular Concrete (GCCC), which can be widely used in both nonstructural and structural applications, and for thermal insulation in the construction industry.

One embodiment of the present invention provides geopolymer composite compositions and methods to make cellular concrete for nonstructural thermal insulation applications including: (i) one Class F fly ash; (ii) at least one hardening enhancer, e.g., ground granulated blast furnace slag or vitreous calcium aluminosilicate, or Class C fly ash; (iii) at least one gelation enhancer, e.g., metakaolin or ground pumice powder or micron- or submicron particles of silica fume and aluminum hydroxide; (iii) one or more alkaline activators; and iv) at least one foaming agent such as aluminum powder, Fe—Si powder, hydrogen peroxide, alkali peroxides, alkali perborates, alkali perchlorides. The components (i), (ii) and (iii) constitute a ternary geopolymer composite binder for cellular concrete.

Another embodiment provides geopolymer composite compositions and methods to make a high strength cellular concrete for structural applications. The methods comprise mixing of: (i) at least one hardening enhancer, e.g., ground granulated blast furnace slag, vitreous calcium silicate, kiln dust, Class C fly ash; (ii) at least one gelation enhancer, e.g., metakaolin; (iii) Class F fly ash; (iv) at least one aggregate, e.g., river sand, lightweight aggregate (LWA), pumice, cenosphere, hollow glass or ceramic particles; (v) at least one alkali silicate activator; and (vi) at least one foaming agent. The components from i) to iii) constitute a ternary geopolymer composite binder for cellular concrete.

In some embodiments, a GCCC of the present invention may contain one or more accelerators, e.g., alkali fluoride, calcium salts such as $CaCl_2$, alkali oxalate, and alkali sulfate. Addition of these admixtures may improve early and final strength of the cellular concrete products. Optionally a GCCC composition may contain gypsum, reactive magnesium oxide (MgO) or certain commercially available shrinkage reducing admixtures to reduce shrinkage of the cellular concrete. To vary the set time, a GCCC composition may also contain one or more set retarders such as sodium metaphosphate, borax, boric acid, alkali citrates such as sodium citrate, barium hydroxide, and barium nitrate and barium chloride, zinc nitrate and chloride, alkali phosphate compounds such as sodium metaphosphate. In some embodiments, a GCCC composition may contain one or more chopped fibers, e.g., organic fiber, glass fiber, basalt fiber, mineral fiber for reinforcement. In some embodiments, a GCCC composition may contain one or more superplasticizers to further reduce water demand and improve rheological properties of the paste for optimal volumetric expansion and a stable cellular structure.

In some embodiments, the GCCC has a 28-day compressive strength of at least 1000 psi (6.89 MPa) with a density of 600 kg/m$^3$. In some embodiments, the GCCC has a 28-day compressive strength of at least 3000 psi (about 21 MPa) with a density of 1200 kg/m$^3$. In one embodiment, the GCCC has a 28-day compressive strength of at least 8000 psi (about 56 MPa) with a density of 1500 kg/m$^3$. In some embodiments, the GCCC is cured at room temperatures, e.g., 20° C. In one embodiment, the GCCC is cured at elevated temperatures such as between 30° C. and about 90° C. The GCCC products exhibit a gasification-induced porosity of about 10% to about 90%.

In one embodiment, the present invention provides compositions and methods of preparation of geopolymer composite cellular concrete for thermal insulation. The GCCC mix can include: i) one Class F fly ash; and ii) at least one hardening enhancer such as ground granulated blast furnace slag, Class C fly ash, vitreous calcium aluminosilicate, and kiln dust; iii) at least one gelation enhancer such as metakaolin, certain dehydrated clays, dehydrated zeolite, micron particles of silica (including silica fume, colloidal silica, etc.) and alumina in appropriate proportions, and volcanic ash (pumice); iv) one or more alkali silicate activators; and v) at least one foaming agent, e.g., aluminum powder, Fe—Si powder, hydrogen peroxide, alkali peroxides, and alkali perborates.

In one embodiment, the present invention provides methods of making a high strength GCCC for structural applications. The methods comprise mixing: (i) at least one hardening enhancer, e.g., ground granulated blast furnace slag, vitreous calcium aluminosilicate, Class C fly ash and kiln dust; (ii) at least one gelation enhancer, e.g., metakaolin; (iii) one Class F fly ash; (iv) at least one aggregate, e.g., river sand, lightweight aggregate (LWA), pumice, cenosphere, and hollow glass particles; (v) at least one alkaline activator; and (vi) at least one foaming agent.

In some embodiments, one or more setting retarders, such as boric acid, borax, alkali citrate, barium hydroxide, barium chloride, barium nitrate, zinc nitrate, alkali phosphate compounds such as sodium meta phosphate may be added to a GCCC composition to extend set times, in particular when temperature rise in the paste is significant due to heat released from reactions of foaming agent and water and when blast furnace slag is a major ingredient in a geopolymer composite composition. In some embodiments, one or more accelerators, such as alkali fluoride, calcium salts, alkali oxalate may be added to improve early and/or final strength. Both set retarder and accelerator may be used to regulate set times for optimal volumetric expansion.

In some embodiments of the present invention, one or more types of chopped fibers, e.g., organic fiber, glass fiber, carbon fiber, basalt fiber, mineral fiber may be included for reinforcement.

In some embodiments of the present invention, one or more superplasticizers may be included to further reduce water demand and improve rheological properties of the paste for optimal bubble formation and stable volumetric expansion.

In some embodiments of the present invention, one or more kinds of ultrafine and/or submicron filler particles such as silica fume, ultrafine fly ash, ultrafine furnace slag, and submicron calcium carbonate powder may be included to decrease water demand of a cellular concrete mix and improve rheological properties of the paste, and to enhance product strength by producing additional alkali aluminosilicate and/or CSH gels.

In some embodiments of the present invention, the GCCC products have a density of from about 400 to 1200 kg/m$^3$ with a 28-day compressive strength of about 3 MPa to about 25 MPa. In some embodiments, the GCCC products have a density of about 1200 to 1800 kg/m$^3$ with a 28-day compressive strength of about 17 MPa to about 100 MPa. In some embodiments, the GCCC composition is cured at room temperatures, e.g., 20° C. In some embodiments, the GCCC composition is cured at elevated temperatures such as between 30° C. and about 90° C. or higher. GCCC products comprise a gasification-induced porosity of about 10% to about 90%. In some embodiments, GCCC products comprise porosity of about 10% to about 50% introduced by lightweight aggregates.

Important factors in successfully manufacturing geopolymer composite cellular concretes of the present invention for insulation and structural applications include, (i) use of geopolymer composite binder compositions; (ii) optimization of the composition of the alkaline activator; (iii) control of paste properties for efficient volumetric expansion and stabilization of the cellular structure; and (iv) use of chemical foaming agents and/or low cost lightweight aggregates to achieve low density and high strength products.

The performance of geopolymer products depends on both the reactivity of pozzolans and mass of gel formed during alkali activation. The inventors have found that alkali activation of reactive aluminosilicate materials, such as metakaolin, generates large amounts of alkali aluminosilicate gel (AAS gel). However, reactivity of Class F fly ash in alkaline solution is very slow at room temperature and the paste usually does not develop enough strength even after curing for 7 days. Little alkali-aluminosilicate gel (AAS) forms to increase strength.

In prior art an alkali silicate solution was used to provide additional dissolved silica. The present inventors find that the dissolved silica and/or alumina can come from sources other than alkali silicate solution. For example, in one embodiment, a group of aluminosilicate materials may be used as additional sources of dissolved silica and/or alumina in Class F fly-ash-based geopolymers. The pozzolans should desirably dissolve in an alkaline solution at a much faster rate than Class F fly ash. This group of materials is herein referred to as "gelation enhancer". Examples of this group of materials are metakaolin, zeolitic phases, and micron/submicron particles of silica fume and alumina in an appropriate proportion. In one embodiment, the addition of these gelation enhancers does not substantially affect the reactivity of the fly ash, while it increases the amount of AAS gel, which results in a substantial improvement of compressive strength of the products.

A large body of the literature shows that the AAS gel can coexist with the calcium silicate hydrate (CSH) and/or related gels (e.g., calcium aluminosilicate gel, CASH) and/or crystalline calcium aluminosilicate phases in alkali-activated furnace slag materials. As disclosed in US patent application #20120024196, the present inventors find coexistence of AAS and CSH gel in the geopolymer composite products containing mostly Class F fly ash. Additional metakaolin and blast furnace slag help achieve a higher rate of strength gain as well as a high final strength of the mortar and concrete products even when cured at room temperature. As disclosed in US patent application #2012/0152153 A1, the present inventors find that optimal ratios of AAS and CSH gels can be obtained by appropriate proportioning of geopolymer composite compositions, which will then result in ultrahigh performance of mortar and concrete products. The pozzolanic materials that produce more CSH and/or related gels during alkali activation process are referred to as "hardening enhancers," and are described in more detail below. Examples of these hardening enhancers are in general reactive alkali-earth aluminosilicates including Class C fly ash, blast furnace slag, kiln dust, and vitreous calcium aluminosilicate (VCAS).

Geopolymer composite binders offer a great flexibility in formulating cellular concrete compositions and the properties of their pastes (e.g., set times, viscosity, workability) can be tailored for production of excellent cellular structures. Product density and strengths can be controlled to meet specific structural and nonstructural design requirements. A typical ternary geopolymer composite binder consists of one Class F fly ash, at least one hardening enhancer such as ground granulated blast furnace slag, and at least one gelation enhancer such as metakaolin. In particular, the present invention provides compositions and methods of using mostly Class F fly ash or blast furnace slag to produce low cost, high performance cellular concrete manufactured at room or slightly elevated temperatures but without applying pressure.

Class F Fly Ash

The first ingredient of the GCCC composition is a Class F fly ash, which is considered to be the main ingredient in a typical geopolymer composite cellular concrete. Class F fly ash is a low cost waste product and readily accessible worldwide. The classification of fly ash is based on ASTM C618, which is generally known in the art. One embodiment of the geopolymer composite binder of the present invention comprises Class F fly ash in the amount of, at least about 10 wt. %, such as at least about 40 wt. %, such as at least about 60 wt. % of the dry mixture of a geopolymer composite binder, for example 10 to 90 wt. % of the dry mixture, such as 50 to 80 wt. %. In one embodiment, the dry mixture contains a maximum of about 90 wt. % of Class F fly ash.

A portion of the fly ash is an amorphous aluminosilicate phase (i.e., a glassy material), which is reactive in strongly alkaline solutions. The magnitude of the portion can vary, depending on the origin of the fly ash material. The reactivity of Class F fly ash can depend on the amount of the amorphous phase contained therein and on the particle size of the fly ash. In one embodiment, the fly ash should contain at least 75 wt. % amorphous aluminosilicate phase and have a particle diameter of 60 μm or less, such as 50 μm or less, such as 45 μm or less, such as 30 μm or less. In one embodiment, Class F fly ash with up to 12 wt. % of loss on ignition (LOI) is used. In one embodiment, Class F fly ash has a CaO (and, thus, Ca) content of less than 8 wt. %. In one embodiment, Class F fly ash has a CaO content of about 8 to 15 wt. %.

Hardening Enhancer

The second ingredient in the GCCC composition can be the hardening enhancer, which can be less than about 80 wt. %, such as less than about 50 wt. %, such as less than about 25 wt. %, of the geopolymer composite binder. In one embodiment, the hardening enhancer can be at least about 5 wt. % of the dry mixture of a geopolymer composite binder, for example 5 to 80 wt. %, such as 10 to 25 wt. % of the dry mixture. A hardening enhancer can be any of the following (or a combination thereof): ground granulated blast furnace slag, Class C fly ash, kiln dust, certain calcium-rich zeolites, and vitreous calcium aluminosilicate (VCAS). These alkali-earth aluminosilicate pozzolans are much more reactive than Class F fly ash—they dissolve more readily in alkaline solutions because most of these materials are glassy. The greater reactivity of these components produces a higher concentration of ions, such as silicate, aluminate, calcium hydroxide, which in turn react to produce a denser network of polymer chains (alkali or alkali-earth aluminosilicate) and/or cementitious CSH and/or related gel/CASH phases, and, as a result, higher strength. The present inventors use ground granulated blast furnace slag covered by ASTM C989 in geopolymer composite cellular concrete with grades of at least 80, such as grade 100, such as grade 120.

Ultrafine furnace slag is more reactive than furnace slag grade 120. Ultrafine furnace slag usually has particle sizes less than about 15 μm and a specific surface area of more than 800 $m^2/kg$. An example of commercially available ultrafine slag is MC-300 Micro-fine Cement from De Neef Construction Chemicals. Ultrafine furnace slag improves workability and reduces the water demand. It reduces cracking due to autogenous and plastic shrinkage and ensures excellent durability of the products.

Examples of calcium-rich pozzolanic materials are kiln dust, bottom ash, and vitreous calcium aluminosilicate (VCAS). VCAS is a waste product of fiberglass production. In a typical glass fiber manufacturing facility, about 10-20 wt. % of the processed glass material is not converted into a final product and is rejected as a by-product or waste and sent for disposal to a landfill. VCAS is 100% amorphous and its composition is fairly constant, mainly containing 50-55 wt. % $SiO_2$, 15-20 wt. % $Al_2O_3$, and 20-25 wt. % CaO. Ground VCAS exhibits pozzolanic activity comparable to silica fume and metakaolin when tested in accordance with ASTM C618 and C1240. Therefore, it can be a very effective hardening enhancer by forming additional cementitious compounds such as CSH and CASH gels.

Cement Kiln Dust (CKD) is a by-product of the manufacture of Portland cement, therefore an industrial waste. Over 30 million tons of CKD are produced worldwide annually. Significant amounts of CKD are currently put into landfills. Typical CKD contains 38-64 wt. % CaO, 9-16 wt. % $SiO_2$, 2.6-6.0 wt. % $Al_2O_3$, 1.0-4.0 wt. % $Fe_2O_3$, 0.-3.2 wt. % MgO, 2.4-13 wt. % $K_2O$, 0.2.0 wt. % $Na_2O$. 1.6-18 wt. % $SO_3$, 0.-5.3 wt. % Cl, and 5.0-25 wt. % LOI. CKD is generally a very fine powder (4600-14000 $cm^2/g$ specific surface area) and is a good hardening enhancer. When CKD is used in a geopolymer composite binder for cellular concrete, elevated concentrations of the alkali oxides contained in it enhance geopolymerization. Additional formation of CSH gel, ettringite ($3CaO.Al_2O_3.3CaSO_4.32H_2O$), and/or syngenite (a mixed alkali-calcium sulfate) can help develop high early strength of a geopolymer composite cellular concrete when cured at room temperature.

Gelation Enhancer

The third ingredient in a GCCC composition according to one embodiment of the present invention is the gelation enhancer, which is less than 85 wt. %, such as less than 50 wt. %, such as less than 25 wt. %, such as less than 15 wt. % of the dry mixture of geopolymer composite binders. In one embodiment, the gelation enhancer is at least about 5 wt. % of the dry mixture of a geopolymer composite binder, for example 3 to 80 wt. %, such as 10 to 25 wt. % of the dry composite binder mixture. The gelation enhancer can be any of the following: metakaolin, halloysite, micron/submicron particles of amorphous silica such as silica fume and alumina in an appropriate proportion. Examples of other gelation enhancers include diatomaceous earth, microsilica, which is a highly reactive pozzolan processed from siliceous material from natural deposits, dehydrated clay minerals and various zeolite phases. The pozzolanic materials should be much more reactive than Class F fly ash in alkaline solutions and thus produce abundant AAS gel to support strength development.

One gelation enhancer that may be used in various embodiments of the present invention is metakaolin as it is readily available and has a small particle size (~5 μm). The rates of metakaolin dissolution and polymerization in an alkaline solution can be high (i.e., from minutes to hours), and the water expelled during geopolymerization can help improve the workability of the paste and enhance the hydration process of a hardening enhancer such as ground granulated blast furnace slag.

The geopolymer composite binder dry mixture can be mixed with an alkaline activator solution to form a paste for cellular concrete. The present inventors have discovered that metakaolin increases or decreases the setting time of the GCCC paste depending on the compositions of geopolymer composite binders for cellular concrete. Metakaolin favorably extends the usually short set time of a GCCC composition containing a significant amount of furnace slag or Class C fly ash or VCAS or kiln dust. In contrast, metakaolin also shortens the usually long setting times of GCCC compositions high in Class F fly ash in the geopolymer composite binder. In addition, mixing metakaolin first with a hardening enhancer such as furnace slag for at least 3 minutes can extend set times of the composite binder systems. In general, by including metakaolin in the composite binder composition, initial setting of the paste for cellular concrete can be extended up to 1 hour or longer compared with paste without metakaolin.

The three ingredients described above, i.e., the Class F fly ash, the hardening enhancer and the gelation enhancer, constitute the dry mixture of a ternary geopolymer composite binder composition for cellular concrete, totaling 100 wt. %.

Alkaline Activator

The fourth ingredient in a GCCC composition according to one embodiment of the present invention is an alkaline activator. In addition to the above mentioned geopolymer composite binder components, an alkaline activation solution ("alkaline activator") must be added to the dry mixture of a geopolymer composite binder to form a complete GCCC composition. The alkaline activator is in effect a solution of metal hydroxide and metal silicate. In one embodiment, the metal hydroxide used in the process can be an alkali metal hydroxide. The metal in the metal hydroxide may be an alkali metal such as sodium or potassium or both.

The metal silicate can be an alkali metal silicate and/or alkaline earth metal silicate. The alkali metals include potassium and sodium. Alkali metal silicates, particularly sodium silicate solution, are desirable due to their relatively low cost though potassium silicate has better performance such as decreasing significantly water demand in the GCCC composition. Silica fume, a waste product from ferrosilicon industry is usually used to make the activation solution by dissolving it in an alkali hydroxide solution. Commercially available water glass may be also used to prepare an alkaline activator solution by dissolving it in alkali hydroxide solution. In one embodiment, sodium silicate with a mass ratio of $SiO_2/Na_2O$ (modulus) equal to about 2 to 3.2 may be used. In one embodiment, the sodium silicate solution may comprise about 38 to 55 wt. % alkali silicate solids and about 45 to 62 wt. % water. Alternatively, alkali silicate glass powders can be dissolved in an alkali hydroxide solution to prepare an alkaline activator. Examples of soluble alkali silicate glass commercially available are SS® sodium silicate and Kasolv® potassium silicate from PQ Corporation.

Foaming Agents

The fifth ingredient in a GCCC composition according to one embodiment of the present invention is a foaming agent. Bubbles are made by adding at least one foaming agent to the GCCC slurry usually near the end of the mixing process. Chemical reaction of a foaming agent with the alkaline activator solution generates gas which forms bubbles (cells) and thus the cellular structure within the geopolymer paste. Examples of foaming agents include aluminum powder, Fe—Si powders, zinc, hydrogen peroxide, alkali peroxides such as sodium peroxide, alkali perborates, and alkali and alkali-earth hypochlorites such as sodium or calcium hypochlorite.

In one embodiment of the present invention, aluminum powder may be used due to its efficiency in volumetric expansion and its low cost. In one embodiment of the present invention, aluminum powders may have particle sizes of about 70 microns or less, in other embodiments of the present invention of about 30 microns or less, and in other embodiments of the present invention of about 15 microns or less. Reaction of aluminum powder with alkaline solution in the GCCC composition gives off hydrogen which expands the paste until a desirable volume is reached. Hydrogen is a volatile gas and is replaced rapidly by air. Addition of aluminum powder may be from about 0.01 to about 0.5 wt. % of a GCCC composition to produce geopolymer composite cellular concrete with a density ranging from about 500 to about 1800 $kg/m^3$.

Peroxide-based foaming agents usually release oxygen bubbles when exposed to the alkaline solution in a GCCC paste. Examples of peroxides include hydrogen peroxide, sodium peroxide, calcium peroxide, alkali perborate such as sodium perborate, and the like. In one embodiment of the present invention, hydrogen peroxide solution may be used due to its low cost and easy use. Concentrations of hydrogen peroxide can be about 5 wt. % to 40 wt. % and 20 to 35 wt. %. Hydrogen peroxide solution is added in a range from about 0.01 wt. % to about 1.25 wt. % (calculated as hydrogen peroxide) to a GCCC composition to produce geopolymer composite cellular concrete with a density ranging from about 400 to about 1800 $kg/m^3$.

White silica fume is a waste product of the Si—Zr metallurgy which contains more metal silicon than the gray silica fume from Fe—Si metallurgy. Therefore, it is a highly efficient foaming agent when it is in contact with alkaline solution. Addition of a few percentage of white silica fume alone in a GCCC composition may provide up to a 50% volumetric expansion. When the white silica fume is used, other foaming agents may not be used, in particular for the GCCC for structural applications.

Aggregate

In some embodiments, aggregate is added to improve final strength of geopolymer composite cellular concrete, particularly for structural applications. Structural lightweight concrete usually has an in-place density of 1440 to 1840 kg/m³ compared to normal weight concrete with a density of 2240 to 2400 kg/m³. For structural applications, the concrete strength should be greater than 2500 psi (17 MPa). The primary use of structural lightweight concrete is to reduce the dead load of a concrete structure and thus allow reduce the size of columns, footing and other load bearing elements. The lightweight structural concrete should exhibit comparable or better mechanical and chemical durability than normal concrete. Structural lightweight concrete provides a higher strength-to-weight ratio resulting in lower overall costs, in particular when geopolymer composite binders are used as in the present invention.

Examples of aggregates include normal-weight fine aggregates such as river sand or masonry sand, coarse and fine lightweight aggregates (meet ASTM Specification C330). Examples of lightweight aggregates (LWA) include expanded slag, expanded slate, expanded shale, expanded clay, expanded perlite, pumice, scoria, and expanded palletized fly ash. In one embodiment of the present invention, lightweight aggregates with a density of about 50 kg/m³ to about 1000 kg/m³ may be used. Fine river sand is added to improve the strength of a geopolymer composite cellular concrete Addition of lightweight aggregates instead of fine river sand could further decrease the product density without decreasing the performance of the final product. High performance geopolymer composite cellular concrete for structural applications can be made simply by adding coarse and/or fine lightweight aggregate without using a foaming agent.

In some embodiments, low density of about 1200 to about 1800 kg/m³ can be achieved by incorporating lightweight aggregates without introducing additional air bubbles.

River sand or lightweight aggregates would be added to the GCCC composition in the range of about zero to about 60 wt. %, such as about 0 to about 40 wt. %, such as about 20 to 50 wt. %.

While river sand or lightweight aggregate is not usually used for a GCCC composition for thermal insulation applications with a density of from about 400 to about 1000 kg/m³, some lightweight fillers could be added if bubbles are produced as well, e.g., by chemical reaction of a foaming agent with the alkaline solution. Use of these fine lightweight particles as fillers in a GCCC composition can improve strength significantly while keeping the product density low. Examples of lightweight filler particles include fine expanded perlite, cenosphere, and hollow glass particles and certain organic particles such as expanded polystyrene. Use of these lightweight particles will further improve performance of a geopolymer composite cellular concrete.

Perlite is a volcanic glass that shows relatively high water absorption and is typically formed by hydration of obsidian. When the material reaches temperatures of 850-900° C., water trapped in the structure of the material vaporizes and escapes. This causes the expansion of the material to 7-16 times its original volume. Unexpanded raw perlite has a bulk density of about 1100 kg/m³ while expanded perlite has a bulk density of about 30-150 kg/m³.

Cenosphere is a lightweight, inert, hollow sphere made largely of silica and alumina and filled with air or inert gas, typically produced as a byproduct of coal combustion in power plants. The color of cenospheres varies from gray to almost white and their density is about 0.4-0.8 g/cm³.

In some embodiments, one or more aggregates are added to the geopolymer composite dry mixture. In some embodiments, one or more aggregates are added toward end of mixing when a homogeneous paste consistency is obtained.

Paste Modifiers

In some embodiments, paste modifiers may be needed. Viscosity and initial set time are two very important properties of the pastes produced to make cellular structures. Ideally, a GCCC paste must have a viscosity that not only prevents individual bubbles from coalescing (destabilization of cellular structure) but also from not rising. The initial set time must be long enough for the paste to reach the intended volumetric expansion. Set times longer than necessary may alter and deteriorate the cellular structure. The paste must harden when expansion is complete. In some embodiments, one or more paste modifiers may be added to a GCCC composition to regulate paste properties for optimal volumetric expansion and cellular structure stabilization.

In some embodiments with proper proportioning of a ternary binder composition and optimization of an alkaline activator solution, a GCCC paste with appropriate paste properties for intended volumetric expansion and cellular structure stabilization can be obtained without use of any paste modifiers. However, in some embodiments having a high content of a hardening enhancer such as ground granulated furnace slag one or more set retarders may be needed to extend set times. Heat generated from reaction between a chemical foaming agent and the alkaline solution may shorten the set time of a GCCC paste more than acceptable. If the paste becomes too thick too early, the intended volumetric expansion will be incomplete and a set retarder must be used. Examples of set retarders include certain phosphate compounds such as alkali metaphosphate, phosphoric acid, borax, boric acid, alkali citrates such as sodium citrate, barium hydroxide, barium nitrate, barium chloride, zinc nitrate, and gypsum. In one embodiment of the present invention, one or more set retarders may be added in an amount of less than about 5 wt. %. In one embodiment of the present invention, one or more set retarders may be added in an amount of 0.1 to 2 wt. % of a GCCC composition. In one embodiment of the present invention, sodium metaphosphate, borax and barium chloride may be used as set retarders. While some set retarders such as barium chloride may be added to the alkaline activator solution together with dry mixture of geopolymer composite binders, the present inventors find that the retarding effect is improved if sodium metaphosphate or borax is dissolved in the alkaline activator solution prior to adding the composite binder.

In one embodiment where Class F fly ash is used as the main ingredient in a composite binder composition, the GCCC paste may set very slowly resulting in destabilizing the cellular structure and low strength. One or more accelerators may be included in the cellular concrete mix to obtain a GCCC paste with appropriate set time and viscosity to obtain a stable cellular structure with high product strength. Examples of accelerators include but are not limited to alkali fluorides such as sodium fluoride, calcium salts such as calcium chloride, alkali oxalates such as sodium oxalate, and alkali sulfates such as sodium sulfate. In one embodiment of the present invention, one or more accelerators may be added in a range of about 0 to 5 wt. %. In one embodiment of the present invention, one or more accelerators may be added in a range of about 0.5 to 2.5 wt. % of the geopolymer composite dry mixture.

In some embodiments with high contents of hardening enhancers such as Class C fly ash, the cellular concrete products may have unacceptably large shrinkage. In one embodiment of the present invention, one or more shrinkage reducers may be added in an amount of about 0 to about 20 wt. % of the GCCC composition, In one embodiment of the present invention, one or more shrinkage reducers may be added in an amount of 0 wt. % to about 10 wt.% of a GCCC composition. Examples of shrinkage reducers include reactive MgO, gypsum, and commercially available shrinkage reducing admixtures. Shrinkage reducers are usually mixed together with the geopolymer composite binder components.

In some embodiments, water reducers or superplasticizer solids may be used to not only decrease the amount of water needed to prepare an alkaline activator solution for a GCCC composition but also to modify the paste viscosity. Superplasticizer solids belong to a class of water reducers capable of reducing water content by about 30% for Portland cement based concretes. More recent superplasticizers include polycarboxylic compounds, such as polyacrylates, although any superplasticizer known in the art may be used in the GCCC process.

In one embodiment of the present invention, superplasticizer solids may comprise about 0.0 to about 1 wt. % of a GCCC composition. In one embodiment of the present invention, superplasticizer solids may comprise about 0.0 to about 0.5 wt. % of a GCCC composition. In one embodiment of the present invention, superplasticizer solids may comprise about 0.0 to about 0.25 wt. % of a GCCC composition.

Ultrafine and Submicron Fillers

In some embodiments, ultrafine and/or submicron fillers with a particle size ranging from about 0.05 to about 10 μm may be used to significantly improve rheological properties of a GCCC paste when little water is used. The present inventors find that a GCCC composition with optimal or near optimal water-to-geopolymer solids ratio exhibits a characteristic progression of stages, i.e., visual characteristics while mixing is never interrupted. The mix initially assumes a sand- or granule-like structure, suggesting deficiency in water. After having added ultrafine or submicron filler particles the mix assumes a dough-like structure, which turns into a homogeneous, lump-free paste while one or more foaming agents are added. After pouring the paste into one mold, the paste undergoes volumetric expansion assuming a homogeneous, cellular structure eventually.

Examples of ultrafine or submicron fillers include silica fume, precipitated silica, ultrafine fly ash (UFFA), ultrafine blast furnace slag (UBFS) and submicron calcium carbonate with silica fume being one material that may be used. UFFA is a product processed by mechanically separating an ultrafine fraction with a mean particle size of about 1 to 10 μm from the parent fly ash. Silica fume is the most readily available submicron material, which is a by-product of Fe—Si metallurgy. It appears gray in color due to a few percentage of unburnt carbon. White silica fume contains almost no carbon, but silicon, e.g., from Elkon Products Inc. Preliminary tests conducted by the present inventors show that addition of only a few weight percent of white silica fume to a GCCC composition can result in a volumetric expansion up to 50%. Therefore, while the white silica fume functions as submicron filler, it is also an efficient foaming agent. Coal gasification fly ash is discharged from respective power stations. This fly ash is usually a $SiO_2$-rich material consisting mainly of spherical particles with a maximum particle size of about 5 to 10 μm. Thus, coal gasification fly ash is also a suitable filler.

In one embodiment, the ultrafine and submicron filler may comprise from 1 to about 12 wt. % of a GCCC composition. In one embodiment, the ultrafine and submicron filler may comprise from about 1 to about 5 wt. % of a GCCC composition Fibers for Reinforcement Optionally, fiber can be added to a GCCC composition up to about 5 wt. %, such as up to about 2.5 wt. %, such as up to about 1 wt. %, such as up to 0.5 in order to improve flexural strength of cellular concrete products. Addition of short fibers may also enhance stabilization of the cellular structure during volumetric expansion. Fibers include organic fibers (e.g., polyvinyl alcohol fibers and polyacrylonitrile fibers); glass fibers (e.g., basalt fibers); and carbon fibers.

In one embodiment, The present invention relates to a process for the manufacture of geopolymer composite cellular concrete comprising the following steps:
  a. Premixing ternary geopolymer composite binder components, shrinking reducers if any, river sand if any, fibers if any, and lightweight aggregate if any
  b. Mixing the blend of composite binder components with at least one alkaline activator solution, which comprises water, alkali hydroxide, alkali silicate, set retarder if any, accelerator if any, and superplasticizer if any.
  c. Adding ultrafine and/or submicron particles, if any, during mixing
  d. Adding at least one foaming agent near the end of mixing
  e. Pouring the mixture of step (d) into a mold and allowing it to foam, expand, set, and harden
  f. Removing the hardened body from the mold
  g. Optionally cutting and shaping the hardened body
  h. Curing the geopolymer composite cellular concrete products at room temperature or at higher temperatures The dry constituents described above, except for the micron/submicron filler are premixed in an appropriate mixer, such as an intensive mixer. Then, the alkaline activation solution, together with the superplasticizer (if any) and/or accelerator (if any), are poured into the dry mixture and mixed. In some embodiments, retarding compounds such as barium chloride, borax and sodium metaphosphate are dissolved in the alkaline activator solution before mixing with the geopolymer composite dry mixture. In one embodiment of the present invention, the foaming agent is added near the end of the mixing process. The volumetric expansion decreases the density of the not-foamed product about 1.25 to about 4.0 times.

Constraining Parameters

Constraining parameters are defined as either molar ratios or mass fractions and their ranges. Constraining parameters can be used to define certain non-limiting formulations of geopolymer composite cellular concrete composition for thermal insulation and structural applications. The constraining parameters are set for the specific ingredients used in the geopolymer composite binder compositions.

The constraining parameters for metakaolin as a gelation enhancer include a set of molar ratios of $SiO_2/Al_2O_3$, $M_2O/Al_2O_3$, and $H_2O/M_2O$, where M represents alkali metals (Na, K, Li) or alkali-earth metals (Ca, Mg). The molar $SiO_2/Al_2O_3$ ratio in metakaolin is about 2. Alkali hydroxide and alkali silicate are added to the solution to obtain the required values for the molar ratios characteristic of a metakaolin based AAS gel. For example, the $SiO_2/Al_2O_3$ molar ratio in the AAS gel ranges from about 2.5 to 6.0, such as 3.0 to 4.0; $M_2O/Al_2O_3$ ranges from about 0.7 to 1.5, such as from 0.9 to 1.25; and $H_2O/M_2O$ ranges from about 5 to 18, such as from about 6 to 10.

The constraining parameters for Class F fly ash (as a main ingredient), Class C fly ash, VCAS, kiln dust, or blast furnace slag (as a hardening enhancer) require a set of mass fractions of $M_2O$, $SiO_2$, $H_2O$ and molar ratio $SiO_2/M_2O$ that are used to formulate an activation solution. Mass fractions of $M_2O$ or $SiO_2$ of the pozzolanic materials, either as a main ingredient or a hardening enhancer can range from about 0.01 to 0.15, such as about 0.04 to 0.075. The molar $SiO_2/M_2O$ ranges from about 0.2 to 2.5, such as about 0.5 to 1.8, such as 1.0 to 1.8. The mass fraction of $H_2O$ of the main ingredient or a hardening enhancer can range from about 0.20 to 0.50, such as from about 0.25 to 0.30. Alkali metals can be Na, K, or Li, and Na in particular can be used to save costs. The amounts of alkali hydroxide, alkali silicate, and water needed for each geopolymer composite binder component are summed up to formulate a GCCC activation solution composition.

The water-to-geopolymer solids mass ratio (w/c) is a key parameter for a GCCC composition. As used herein, the term "geopolymer solids" is defined as the sum of the masses of reactive constituents in the composite binder (i.e., Class F fly ash, hardening enhancer and gelation enhancer) and masses of alkali oxide and silicon dioxide dissolved in the alkaline activator solution. The w/c ratio is determined by a set of constraining parameters such as the molar ratio $H_2O/M_2O$ for metakaolin, mass fraction of $H_2O$ for Class F fly ash and reactive alkali-earth aluminosilicate as hardening enhancer, and whether and how much superplasticizer and/or ultrafine and/or submicron filler is applied. In some embodiments for structural applications, masonry sand with moisture absorption of about 2.5 wt. % is used as a fine aggregate. If the moisture content of the fine aggregate deviates from about 2.5 wt. %, the GCCC composition must be corrected to comply with a prescribed w/c. In some embodiments where hydrogen peroxide is applied as a foaming agent, the mix must be corrected taking into account of $H_2O$ in $H_2O_2$ (e.g. 35 wt. % $H_2O_2$ in $H_2O$). Typically, w/c ratios in GCCC compositions range from about 0.20 to 0.55, such as about 0.30 to 0.45.

The water-to-geopolymer solids mass ratio (w/c) determines almost exclusively the viscosity of a GCCC paste. A good GCCC paste should not be so thin that bubbles coalesce and rise to the surface and not so thick that volumetric expansion is not optimal. A superplasticizer reduces the demand of water and decreases the plastic viscosity such that volumetric expansion can take place. Addition of an ultrafine and/or submicron filler tends to decrease the plastic viscosity and yield stress while reducing water demand. However, addition of an accelerator may render the paste thicker. Another important property of a GCCC paste is set times. The present inventors find that a right GCCC paste should have an initial set time of about 30 to about 90 min. The flexibility of the geopolymer composite binder compositions according to one embodiment of the present invention offers a great opportunity to design cellular concrete mixes with ideal paste properties. Additions of set retarders and other admixtures such as an accelerator, a superplasticizer, ultrafine and/or submicron filler also help obtain an optimal paste for cellular concrete.

The present inventors have developed a procedure, which they use to determine whether a GCCC composition has a right paste for high strength cellular concrete. A GCCC composition with optimal or near optimal w/c ratio exhibits a characteristic progression through various stages under continued intensive mixing. The mix initially develops a sand- or granule-like consistency. With continued mixing after adding ultrafine or submicron filler particles the sand- or granule-like mixture assumes a dough-like consistency, which turns into a homogeneous paste when metal powder is added toward the end of mixing. The sand- or granule-like particles are about 0.5 to about 2 cm thick. Alternatively, if 35% hydrogen peroxide solution is used as a foaming agent, then this is usually added toward the end of mixing. In one embodiment of the present invention the ideal particle size should be less than 1 cm. In one embodiment of the present invention the ideal particle size should be less than about 0.5 cm. The water contained in hydrogen peroxide solution will render the sand- or granule-like consistency into a homogeneous paste with the right viscosity for optimal bubble formation and stable cellular structure. When hydrogen peroxide solution is used as a foaming agent, ultrafine and/or submicron filler may not be needed.

Table 1 below shows constraining parameters used to formulate alkaline activator solutions for GCCC compositions.

TABLE 1

Constraints and preferred ranges for alkaline activator solution

| Constituents | Ratio | Range | Preferred Range |
|---|---|---|---|
| Class F fly ash (Mass ratio) | $H_2O$/FFA | 0.20-0.40 | 0.25-0.30 |
| | $SiO_2$/FFA | 0.04-0.10 | 0.05-0.08 |
| | $M_2O$/FFA (M = K, Na, or both) | 0.04-0.15 | 0.05-0.08 |
| Hardening enhancer (Mass ratio) | $H_2O$/HDE | 0.20-0.40 | 0.25-0.30 |
| | $SiO_2$/HDE | 0.02-0.10 | 0.04-0.08 |
| | $M_2O$/HDE (M = K, Na, or both) | 0.02-0.10 | 0.04-0.08 |
| Gelation enhancer (Molar ratio) | $SiO_2/Al_2O_3$ | 3.0-5.0 | 3.5-3.9 |
| | $M_2O/Al_2O_3$ | 0.70-1.50 | 0.90-1.25 |
| | $H_2O/M_2O$ (M = K, Na, or both) | 5-18 | 6-10 |

* HDE = Hardening enhancer

Table 2 shows constituents and their proportions for GCCC recipes to make products for thermal insulation according to one embodiment of the present invention.

TABLE 2

Constituents and their preferred proportions in GCCC composition for thermal insulation applications

| Type of materials | Constituents | Range I (wt. %) | Range II (wt. %) |
|---|---|---|---|
| Composite binder | Class F fly ash | 2-60 | 10-50 |
| | Hardening enhancer | 2-60 | 10-50 |
| | Gelation enhancer | 2-60 | 3-25 |
| Alkaline activator | $M_2O$ (M = K, Na, or both) | 2-12 | 4-8 |
| | $SiO_2$ | 2-15 | 6-10 |
| | Water | 10-30 | 15-22 |
| | Ultrafine and/or submicron filler | 0-12 | 0-2 |
| | Fine lightweight aggregate | 0-50 | 0-20 |
| | Shrinkage reducer | 0-10 | 0-5.0 |
| Foaming agent* | Al powder | 0.01-0.50 | 0.025-0.25 |
| | Hydrogen peroxide (35 wt. %) | 0.10-3.00 | 0.25-2.00 |
| Paste modifiers | Accelerator | 0-5 | 0-2.5 |
| | Set retarder | 0-5 | 0.5-2.0 |
| | Superplasticizer solids | 0-2 | 0-0.5 |
| | Chopped fiber | 0-5 | 0.25-2.5 |
| | Sum | 100 | 100 |

*35 wt. % hydrogen peroxide is usually used as an example. Hydrogen peroxide solutions with other concentrations can be used. Higher weight percentages are required for the same density if other foaming agents are used, such as alkali peroxide and alkali hypochlorites.

Table 3 shows constituents and their proportions for GCCC recipes to make products for structural applications according to one embodiment of the present invention.

TABLE 3

Constituents and their preferred proportions in GCCC compositions for structural applications

| Materials | Constituents | Range I (wt. %) | Range II (wt. %) |
|---|---|---|---|
| Composite binder | Class F fly ash | 1-50 | 10-30 |
| | Hardening enhancer | 1-50 | 10-35 |
| | Gelation enhancer | 1-50 | 8-25 |
| Alkaline activator | $M_2O$ (M = K, Na, or both) | 2-12 | 3.5-8 |
| | $SiO_2$ | 2-15 | 3.5-8 |
| | Water | 6-25 | 8-16 |
| | Shrinkage reducer | 0-10 | 0-5.0 |
| | Ultrafine and/or submicron filler | 0-12 | 2-5 |
| Aggregate | River sand | 0-60 | 20-50 |
| | Lightweight aggregate | 0-40 | 0-25 |
| Foaming agent** | Al powder | 0.01-0.50 | 0.02-0.15 |
| | Hydrogen peroxide* | 0.01-2.00 | 0.25-1.25 |
| Paste modifiers | Accelerator | 0-5 | 0-2.5 |
| | Set retarder | 0-5 | 0.5-2.0 |
| | Superplasticizer solids | 0-2 | 0.25-0.50 |
| | Chopped fiber** | 0-5 | 0.25-0.5 |
| | Sum | 100 | 100 |

*Assume 35 wt. % hydrogen peroxide. Optimal weight percentages of other types of foaming agents can be determined by trial testing.

In one embodiment of the present invention, molar concentrations of alkaline hydroxide (e.g., KOH and NaOH) in alkaline activator solutions are in the range from about 3 to 15 M. In one embodiment of the present invention, molar concentrations of alkaline hydroxide in alkaline activator solutions are in the range from about 5 to 10 M. The moisture present in the aggregate (if any) and the water in a foaming agent (i.e., in 35 wt. % hydrogen peroxide solution) are included in the above calculations.

Provided herein is a general approach to obtain an applicable formulation for a GCCC composition. In one embodiment, the dry mixture of a geopolymer composite comprises three ingredients, as described above. The sum of these three ingredients is 100 wt. %. Then masses of the composite binder ingredients are set in desired proportions. The composition of an activation solution is formulated based on a set of constraining parameters and their respective ranges for each geopolymer composite binder component (e.g., Class F fly ash, gelation enhancer and hardening enhancer) by summing up the needed amounts of alkali hydroxide, dissolved silica, and water. When the weight percentages of foaming agent, set retarder if any, accelerator if any, ultrafine and/or submicron filler if any, aggregate if any, and fiber if any are determined, respectively, in a GCCC composition, the compositions of the dry binder and the activation solution are re-normalized so that the total of the dry binder, the activation solution and the additional components amount to 100 wt. %.

Manipulation of the composite constituent proportions within their ranges (see, e.g., Tables 1-3) and subsequent testing allow for optimization of a GCCC composition in terms of paste properties for optimal volume expansion, stable cellular structure, rapid growth of strength and high final strength after curing at room temperature. GCCC compositions according to one embodiment of the present invention may be cured at elevated temperatures.

Initial set times for GCCC compositions according to one embodiment of the present invention range between about 0.25 to about 3 hours, such as about 0.5 to 1 hour. After the composition sets, it is cured for 24 hours, such as 24 hours to one week or longer, at a curing temperature between about 2° C. and about 75° C. Specific set times can be obtained by adjusting binder and filler compositions, e.g., by selecting binder and filler compositions with different reactivity in alkaline solutions, or by other methods known in the art such as adding a retarding compound.

In one embodiment of a GCCC composition of the present invention that includes one or more aggregates, the one or more aggregates may have a particle size of about 0.025 to about 10 mm, and wherein the one or more aggregates comprise about 5 to 70 wt. % of the GCCC composition. In one embodiment of a GCCC composition of the present invention that include one or more lightweight aggregates, the one or more lightweight aggregates may have a particle size of about 0.025 and 20 mm, and wherein the one or more lightweight aggregates comprise about 5 to 50 wt. % of the GCCC composition.

In one embodiment of a GCCC composition of the present invention that includes one or more fine lightweight aggregates that comprise about 1 to about 25 wt. % of the GCCC composition.

In one embodiment of a GCCC composition of the present invention that includes one or more set retarders, the one or more set retarders may comprise about 0.05 to about 5 wt. % of the GCCC composition. In one embodiment of a GCCC composition of the present invention that include set retarders, the one or more set retarders may comprise about 0.5 to 2 wt. % of the GCCC composition.

In one embodiment of a GCCC composition of the present invention that includes one or more fiber materials, the one or more fiber materials may comprise about 0.1 to about 5 wt. % of the GCCC composition. In one embodiment of a GCCC composition of the present invention that includes one or more fiber materials, the one or more fiber materials may comprise about 0.25 to about 2.5 wt. % of the GCCC composition.

In one embodiment of a GCCC composition of the present invention that includes one or more submicron fillers, the one or more submicron fillers may comprise about 2 to about 5 wt. % of the GCCC composition. In one embodiment of a GCCC composition of the present invention that includes one or more submicron fillers, the one or more submicron fillers may comprise about 2 to about 5 wt. % of the GCCC composition.

In one embodiment of a GCCC composition of the present invention that includes one or more superplasticizer solids, the one or more superplasticizer solids may comprise 0.01 to about 1 wt. % of the GCCC composition.

The foregoing description of the embodiments of the invention has been presented for purposes of illustration and description. It is not intended to be exhaustive or to limit the invention to the precise form disclosed, and modifications and variations are possible in light of the above teaching or may be acquired from practice of the invention. The embodiments have been chosen and described in order to explain the principles of the invention and as a practical application to enable one skilled in the art to utilize the invention in various embodiments and with various modifications suited to the particular use contemplated. It is intended that the scope of the invention be defined by the claims appended hereto and their equivalents.

EXAMPLES

In the following examples, all the GCCC pastes were cured at room temperatures, e.g., at about 20° C., except where other curing temperatures are specified.

Masonry sand from Aggregates Industries was used as fine aggregate, which has a particle size between 50 and 600 μm with a median size of about 250 μm. The moisture in the fine aggregate was about 2.5 wt. % at room temperature. The moisture in the fine aggregate was included to calculate molar concentrations of alkali hydroxide and water to geopolymeric solids ratio. wt. %

Metakaolin (Kaorock) was from Thiele Kaolin Company, Sandersville, Ga. The metakaolin had a particle size between 0.5 and 50 µm with 50 vol. % less than 4 µm.

Ground granulated blast furnace slag grade 120 (NewCem Slag cement) was from Lafarge, North America Inc. (Baltimore Terminal). The furnace slag had a particle size between 0.5 to 60 µm, with 50 vol. % less than 7 µm.

Silica fume, an industrial waste product from Fe—Si alloying, was from Norchem Inc. The silica fume contained 2.42 wt. % carbon. The silica fume was used to prepare alkaline activator solutions by dissolving silica fume in alkali hydroxide solution, or added as submicron filler.

Commercially available sodium silicate solution (Ru™ sodium silicate solution, PQ Corp) was used to prepare an alkaline activator solution. The sodium silicate solution contained about 14 wt. % $Na_2O$, 33 wt. % $SiO_2$ and 53 wt. % water.

One Class F fly ash from Brandon Shores Power Station, Baltimore, Md., was from Separation Technologies LLC. The Brandon Shores fly ash had lower CaO (0.9 wt. %) and a low loss on ignition (<1.5 wt. %) and was marketed under the name ProAsh. The Brandon Shores fly ash had a particle size between 0.6 and 300 µm with 50 vol. % below 26 µm. Another Class F fly ash from SEFA Group (South Carolina, USA) was produced by a thermal beneficiation process. The fly ash contained about 1.5 wt. % CaO and had a particle size between 0.5 and 300 µm with 50 vol. % below 15 µm. Yet another fly ash was Orland fly ash from Headwaters Incorporation. The fly ash had a very high loss on ignition, e.g., 7 to 9 wt. %.

Synthetic polypropylene fibers (20 mm in length) from Grace Construction Products were used for reinforcement.

Compressive strength was measured on a Test Mark CM-4000-SD compression machine. During testing, all cylindrical samples were capped with compression caps from Delauriers, Inc.

The foaming agent, accelerator, set retarder, chopped fiber, and superplasticizer solids if any are not included in a GCCC formulation given in the examples below. These components were weighed in the amount of wt. % of a GCCC formulation. Adding them to the other solids yielded the final GCCC composition (not shown in the examples). The water in the hydrogen peroxide solution is part of a GCCC formulation.

Example 1

KOH (assay 90%) and NaOH (assay 99%) were dissolved in tap water to make alkaline solution using a mechanical stirrer. Silica fume from Norchem Inc. was then dissolved in the KOH and/or NaOH solution under stirring. The alkaline activator solution was black due to undissolved carbon. The alkaline activator solution was aged for up to 7 days before sample preparation.

To prepare the GCCC for structural applications, the following constituents were mixed dry:
Brandon Shore Class F fly ash (10.00 wt. %)
Metakaolin as gelation enhancer (5.64 wt. %),
Ground granulated blast furnace slag as hardening enhancer (14.55 wt. %),
Masonry sand as fine aggregate (50.00 wt. %) and
Synthetic polypropylene fiber (0.5 wt. %).

Then, the alkaline activator solution was prepared by mixing:
$Na_2O$ (1.36 wt. %) as NaOH,
$K_2O$ (3.08 wt. %) as KOH,
$SiO_2$ (3.92 wt. %) as silica fume, and
$H_2O$ (9.45 wt. %).

The alkaline activator solution was mixed with the premixed dry constituents for 3 minutes in an intensive mixer (20L K-Lab Mixer from Lancaster Products). Then, silica fume (2 wt. %) as submicron filler was added under continued mixing for another 3 minutes. 1 minute before end of mixing, aluminum powder (20 µm median size, 0.05 wt. % of the GCCC composition) was added as a foaming agent. The paste was poured in 3"×6" cylindrical molds, allowed to expand and fill the mold, and subsequently cured at room temperature. After 24 hours, the sample was de-molded and stored at room temperature. After curing for 28 days, the apparent density was determined to be 1403 kg/m³ and compressive strength was measured to be 3637 psi or 25.08 MPa (Sample #1, Table 4).

Additional GCCC samples were prepared with the same composition and procedure described in Example 1 wt. % but varying the amount of aluminum powder (20 µm median size). The wt. % aluminum powder concentration, the apparent density and the compressive strength of the additional samples are shown in Table 4.

TABLE 4

| Sample | Al powder (wt. %) | Mixing of Al | Fiber (wt. %) | Density (kg/m³) | Compressive strength | |
|---|---|---|---|---|---|---|
| | | | | | psi | MPa |
| #1 | 0.025 | 1 min | 0.5 | 1403 | 3637 | 25.08 |
| #2 | 0.010 | 1 min | 0.5 | 1614 | 6509 | 44.88 |
| #3 | 0.075 | 1 min | 0.5 | 1235 | 2234 | 15.40 |
| #4 | 0.015 | 1 min | 0.5 | 1723 | 6269 | 43.22 |
| #5 | 0.020 | 1 min | 0.5 | 1493 | 2898 | 19.98 |
| #5a | 0.05 | 1 min | 0.5 | 1201 | 2979 | 20.54 |

Example 2

To prepare the GCCC for structural applications, the following constituents were first mixed dry:
Brandon Shore Class F fly ash (16.00 wt. %)
Metakaolin as gelation enhancer (9.92 wt. %),
Ground granulated blast furnace slag as hardening enhancer (25.60 wt. %),
Masonry sand as fine aggregate (20.00 wt. %) and
Synthetic polypropylene fiber (0.5 wt. %)

Then, the alkaline activator solution was prepared by mixing:
$Na_2O$ (1.94 wt. %) as NaOH,
$K_2O$ (3.90 wt. %) as KOH,
$SiO_2$ (6.63 wt. %) as silica fume, and
$H_2O$ (14.00 wt. %)

The alkaline activator solution was mixed with the premixed dry constituents for 3 minutes in an intensive mixer (20L K-Lab Mixer from Lancaster Products). Then, silica fume (2 wt. %) as submicron filler was added under continued mixing for another 3 minutes. 1 minute toward before end of mixing, aluminum powder (20 µm median size, 0.08 wt. % of the GCCC composition) was added. The paste was poured in a 3"×6" cylindrical mold, allowed to expand and fill the mold, and subsequently cured at room temperature. After 24 hours, the sample was de-molded and stored at room temperature. After curing for 28 days, the apparent density was determined to be 1202 kg/m³ and compressive strength was measured to be 3159 psi or 21.78 MPa (Sample#6).

Example 3

To prepare the GCCC for thermal insulation applications, the following constituents were first mixed dry:
Brandon Shore Class F fly ash (16.00 wt. %)
Metakaolin as gelation enhancer (9.92 wt. %),
Ground granulated blast furnace slag as hardening enhancer (25.60 wt. %),
Masonry sand as fine aggregate (20.00 wt. %) and
Synthetic polypropylene fiber (0.3 wt. %).
Then, the alkaline activator solution was prepared by mixing:
$Na_2O$ (1.94 wt. %) as NaOH,
$K_2O$ (3.90 wt. %) as KOH,
$SiO_2$ (6.63 wt. %) as silica fume, and
$H_2O$ (14.00 wt. %).

The alkaline activator solution was mixed with the pre-mixed dry constituents for 3 minutes in an intensive mixer (20L K-Lab Mixer from Lancaster Products). Then, silica fume (2 wt. %) as submicron filler was added under continued mixing for another 3 minutes. 1 minute toward ending of mixing, aluminum powder (20 µm median size, 0.15 wt. % of the GCCC composition) was added. The paste was poured in a 3"×6" cylindrical mold, allowed to expand and fill the mold, and subsequently cured at room temperature. After 24 hours, the sample was de-molded and stored at room temperature. After curing for 28 days, the apparent density was determined to be 880 kg/m³ and the compressive strength was measured to be 1282 psi or 8.84 MPa (Sample #7, Table 5).

Additional GCCC samples were prepared with the same composition and procedure in Sample 7 but with different wt. % amounts of aluminum powder as well as different median particle sizes. The wt. % aluminum powder concentration, the Al particle size, the apparent density and the compressive strength of the additional samples are shown in Table 5.

TABLE 5

| Sample | Al powder (wt. %) | Al median size | Fiber (wt. %) | Density (kg/m³) | Compressive strength | |
|---|---|---|---|---|---|---|
| | | | | | psi | MPa |
| #7 | 0.15 | 20 µm | 0.3 | 880 | 1282 | 8.84 |
| #8 | 0.25 | 20 µm | 0.3 | 839 | 1120 | 7.72 |
| #9 | 0.25 | 20 µm | 0.0 | 788 | 582 | 4.01 |
| #10 | 0.35 | 20 µm | 0.3 | 774 | 812 | 5.60 |
| #11 | 0.30 | 9 µm | 0.0 | 680 | 461 | 3.18 |
| #12 | 0.30 | 35 µm | 0.0 | 770 | 679 | 4.68 |
| #13 | 0.30 | 20 µm | 0.0 | 817 | 697 | 4.81 |

Example 4

To prepare the GCCC for thermal insulation applications, the following constituents were first mixed dry:
Brandon Shore Class F fly ash (10.00 wt. %)
Metakaolin as gelation enhancer (5.64 wt. %),
Ground granulated blast furnace slag as hardening enhancer (14.55 wt. %), and
Masonry sand as fine aggregate (50.00 wt. %).
Then, the alkaline activator solution was prepared by mixing:
$Na_2O$ (1.36 wt. %) as NaOH,
$K_2O$ (3.08 wt. %) as KOH,
$SiO_2$ (3.92 wt. %) as silica fume, and
$H_2O$ (9.45 wt. %).

The alkaline activator solution was mixed with the pre-mixed dry constituents for 3 minutes in an intensive mixer (20L K-Lab Mixer from Lancaster Products). Then, silica fume (2 wt. %) as submicron filler was added and continued mixing for another 3 minutes. 1 minute before end of mixing, aluminum powder (20 µm median size, 0.08 wt. % of the GCCC composition) was added. The paste was poured in a 3"×6" cylindrical mold, allowed to expand and fill the mold, and subsequently cured at room temperature. After 24 hours, the sample was de-molded and stored at room temperature. After curing for 28 days, the apparent density was determined to be 1098.35 kg/m³ and the compressive strength was measured to be 1537 psi or 10.64 MPa (Sample #14).

Example 5

To prepare the GCCC for thermal insulation applications, the following constituents were first mixed dry:
Brandon Shore Class F fly ash (12.50 wt. %)
Metakaolin as gelation enhancer (11.58 wt. %),
Ground granulated blast furnace slag as hardening enhancer (12.50 wt. %),
Masonry sand as fine aggregate (12.50 wt. %) and
Synthetic polypropylene fiber (0.3 wt. %).
Then, the alkaline activator solution was prepared by mixing:
$Na_2O$ (5.42 wt. %) as NaOH,
$K_2O$ (0.47 wt. %) as KOH,
$SiO_2$ (7.79 wt. %) as silica fume, and
$H_2O$ (17.85 wt. %).

The alkaline activator solution was mixed with the pre-mixed dry constituents for 3 minutes in an intensive mixer (20L K-Lab Mixer from Lancaster Products). Then, silica fume as submicron filler (2 wt. %) was added under continued mixing for another 3 minutes. 1 minute before end of mixing, aluminum powder (20 µm median size, 0.05 wt. % of the GCCC composition) was added. The paste was poured in a 3"×6" cylindrical mold, allowed to expand and fill the mold, and subsequently cured at room temperature. After 24 hours, the sample was de-molded and stored at room temperature. After curing for 28 days, the apparent density was determined to be 910 kg/m³ and the compressive strength was measured to be 1712 psi or 11.80 MPa (Sample #15).

Example 6

To prepare the GCCC for thermal insulation applications, the following constituents were first mixed dry:
Brandon Shore Class F fly ash (19.00 wt. %)
Metakaolin as gelation enhancer (13.13 wt. %),
Ground granulated blast furnace slag as hardening enhancer (33.89 wt. %), and
Synthetic polypropylene fiber (0.3 wt. %).
Then, the alkaline activator solution was prepared by mixing:
$Na_2O$ (5.37 wt. %) as NaOH,
$K_2O$ (1.00 wt. %) as KOH,
$SiO_2$ (8.76 wt. %) as silica fume, and
$H_2O$ (16.85 wt. %).

The alkaline activator solution was mixed with the pre-mixed dry constituents for 3 minutes in an intensive mixer (20L K-Lab Mixer from Lancaster Products). Then, silica fume (2 wt. %) as submicron filler was added under continued mixing for another 3 minutes. 1 before end of mixing, aluminum powder (20 µm median size, 0.25 wt. % of the GCCC composition) was added. The paste was poured in a 3'''×6" cylindrical mold, allowed to expand and fill the mold, and subsequently cured at room temperature. After 24 hours, the sample was de-molded and stored at room temperature. After curing for 28 days, the apparent density was determined to be 730 kg/m³ and the compressive strength was measured to be 831 psi or 5.73 MPa (Sample #16).

Example 7

To prepare the GCCC for thermal insulation applications, the following constituents were first mixed dry:
Brandon Shore Class F fly ash (18.66 wt. %)
Metakaolin as gelation enhancer (12.89 wt. %),
Ground granulated blast furnace slag as hardening enhancer (33.27 wt. %), and
Synthetic polypropylene fiber (0.03 wt. %).
Then, the alkaline activator solution was prepared by mixing:
Na₂O (5.28 wt. %) as NaOH,
K₂O (0.98 wt. %) as KOH,
SiO₂ (8.60 wt. %) as silica fume, and
H₂O (18.35 wt. %).
The alkaline activator solution was mixed with the premixed dry constituents for 3 minutes in an intensive mixer (20L K-Lab Mixer from Lancaster Products). Then, silica fume (1.96 wt. %) as submicron filler was added under continued mixing for another 3 minutes. 1 minute before end of mixing, aluminum powder (20 µm median size, 0.15 wt. % of the GCCC composition) was added. The paste was poured in a 3"×6" cylindrical mold, allowed to expand and fill the mold, and subsequently cured at room temperature. After 24 hours, the sample was de-molded and stored at room temperature. After curing for 28 days, the apparent density was determined to be 790 kg/m³ and the compressive strength was measured to be 1132 psi or 7.80 MPa (Sample #17).

Example 8

To prepare the GCCC for thermal insulation applications, the following constituents were first mixed dry:
Brandon Shore Class F fly ash (11.90 wt. %) and
Ground granulated blast furnace slag as hardening enhancer (54.21 wt. %).
The alkaline activator solution (modulus ~1.65) was prepared by mixing sodium hydroxide solution and Ru™ sodium silicate solution (PQ Inc) such that the following concentrations were obtained in the GCCC composition:
Na₂O (4.96 wt. %)
SiO₂ (7.93 wt. %), and
H₂O (20.00 wt. %).
The alkaline activator solution was mixed with the premixed dry constituents for 3 minutes in an intensive mixer (20L K-Lab Mixer from Lancaster Products). Then, silica fume as submicron filler was added under continued mixing for another 3 minutes. 1 minute before end of mixing, aluminum powder (20 µm median size, 0.25 wt. % of the GCCC composition) was added. The paste was poured in 3"×6" cylindrical molds and allowed to expand and fill the mold and subsequently cured at room temperature. After 24 hours, the sample was de-molded and stored at room temperature. After curing for 28 days, the apparent density was determined to be 597.3 kg/m³ and the compressive strength was measured to be 870 psi or 6.0 MPa (Sample#18, Tables 6 and 7).

Additional samples were prepared in the similar way but the paste was poured in 4"×4"×16" beam molds instead and allowed to expand, and subsequently cured at room temperature. After 7 days, the samples were de-molded and were sawed wet into 4" cubes. After drying for 3 days in ambient environment, the apparent density and compressive strength were measured (Sample#19-21, Tables 6 and 7 below).

TABLE 6

| | GCCC Composition (wt. %) | | | | | | |
|---|---|---|---|---|---|---|---|
| Sample | FFA | MK | BFS | SF | SiO₂ | Na₂O | Water | Sum |
| #18 | 11.90 | 0.00 | 54.21 | 1.00 | 7.93 | 4.96 | 20.00 | 100.00 |
| #19 | 13.35 | 0.00 | 53.39 | 1.00 | 8.01 | 5.01 | 19.25 | 100.00 |
| #20 | 20.17 | 0.00 | 47.06 | 1.00 | 7.89 | 4.93 | 18.95 | 100.00 |
| #21 | 13.35 | 0.00 | 53.39 | 1.00 | 8.01 | 5.01 | 19.25 | 100.00 |

TABLE 7

| Sample | Retarder (wt. %) | Al (wt. %) | Fiber (wt. %) | W/C | NaOH (M) | Density (kg/m³) | Compressive strength | |
|---|---|---|---|---|---|---|---|---|
| | | | | | | | psi | MPa |
| #18 | None | 0.25 | 0.40 | 0.25 | 8.00 | 777 | 1595 | 11.00 |
| #19 | None | 0.15 | 0.15 | 0.24 | 8.39 | 725 | 415 | 2.86 |
| #20 | None | 0.175 | 0.30 | 0.24 | 8.39 | 733 | ND | ND |
| #21 | None | 0.145 | 0.00 | 0.24 | 8.39 | ND | ND | ND |

ND = Not determined

Example 9

To prepare the GCCC for thermal insulation applications, the following constituents were first mixed dry in an intensive mixer (20L K-Lab Mixer from Lancaster Products):
Brandon Shore Class F fly ash (13.69 wt. %)
Ground granulated blast furnace slag as hardening enhancer (54.75 wt. %), and
Additional synthetic polypropylene fiber (0.3 wt. % of the GCC mix).
Then, an alkaline activator solution (modulus ~1.6) was prepared by mixing sodium hydroxide solution powder in Ru™ sodium silicate solution (PQ Inc) such that the following concentrations were obtained in the GCCC composition:
Na₂O (5.13 wt. %) as NaOH,
SiO₂ (8.21 wt. %) as silica fume, and
H₂O (17.19 wt. %).
Borax as a set retarder was dissolved in the alkaline activator solution in the amount of 1.00 wt. % of the GCCC composition. The alkaline activator solution with borax was mixed with the pre-blended dry mixture in an intensive mixer (20L K-Lab Mixer from Lancaster Products) for 3 min.

Then, silica fume (1.03 wt. %) as submicron filler was added under continued mixing for another 3 minutes. 45 seconds before end of mixing, 35% hydrogen peroxide solution was added as a foaming agent into the mixture in the amount of 1.75 wt. % of the GCCC composition. The paste was poured in a 3"×6" cylindrical mold, allowed to expand and fill the mold, subsequently cured at room temperature. After 24 hours, the sample was de-molded and stored at room temperature. After curing for 28 days, the apparent density was determined to be 777 kg/m³ and the compressive strength was measured to be 1595 psi or 11.00 MPa (Sample #22, Tables 8 and 9).

Additional GCCC samples were prepared with similar compositions and preparation procedures as used in Sample #22. Compositions, apparent densities and compressive strengths of the additional samples (#22 to #25) are given in Tables 8 and 9.

TABLE 8

| | GCCC composition (wt. %) | | | | | | | |
|---|---|---|---|---|---|---|---|---|
| Sample | FFA | MK | BFS | SF | $SiO_2$ | $Na_2O$ | Water | Sum |
| #22 | 13.69 | 0.00 | 54.75 | 1.03 | 8.21 | 5.13 | 17.19 | 100.00 |
| #23 | 13.58 | 0.00 | 54.32 | 1.02 | 8.15 | 5.09 | 17.84 | 100.00 |
| #24 | 13.61 | 0.00 | 54.45 | 1.02 | 8.17 | 5.10 | 17.65 | 100.00 |
| #25 | 13.30 | 0.00 | 53.19 | 1.00 | 7.98 | 4.99 | 19.55 | 100.00 |

TABLE 9

| Sample | Retarder (wt. %) | $H_2O_2$ (wt. %) | Fiber (wt. %) | W/C | NaOH (M) | Density (kg/m³) | Compressive strength psi | Compressive strength MPa |
|---|---|---|---|---|---|---|---|---|
| #22 | 1.00* | 1.75 | 0.30 | 0.21 | 9.63 | 777 | 1595 | 11.00 |
| #23 | 1.20** | 1.75 | 0.30 | 0.22 | 9.21 | 585 | 600 | 4.14 |
| #24 | 1.20** | 1.50 | 0.30 | 0.21 | 9.33 | 672 | 1145 | 10.15 |
| #25 | 1.00** | 0.20$ | 0.30 | 0.24 | 8.23 | 813 | 986 | 6.80 |

*Borax;
**Sodium trimetaphosphate;
$metal aluminum powder (20 micron size)

Then, silica fume (0.99 wt. %) as submicron filler was added under continued mixing for another 3 minutes. 1 minute before end of mixing, hydrogen peroxide solution (37 wt. % concentration) was added as a foaming agent into the mixture in the amount of 2.25 wt. % of the GCCC composition. The paste was poured in a 3"×6" cylindrical mold, allowed to expand and fill the mold, and subsequently cured at room temperature. The initial set time was determined to be 43 minutes. After 24 hours, the sample was de-molded and stored at room temperature. After curing for 28 days, the apparent density was determined to be 574 kg/m³ and the compressive strength was measured to be 649 psi or 4.47 MPa (Sample #26, Tables 10 and 11).

Additional GCCC samples were prepared with similar compositions, the same amount of SHMP as a set retarder and the preparation procedure described in Sample #26. Compositions, apparent densities and compressive strengths of the additional samples (#27 to #30) are given in Table 10 and 11.

TABLE 10

| | GCCC composition (wt. %) | | | | | | | |
|---|---|---|---|---|---|---|---|---|
| Sample | FFA | MK | BFS | SF | $SiO_2$ | $Na_2O$ | Water | Sum |
| #26 | 13.29 | 9.97 | 43.19 | 0.99 | 7.78 | 5.04 | 19.73 | 100.00 |
| #27 | 13.31 | 9.98 | 43.25 | 1.00 | 7.82 | 5.07 | 19.56 | 100.00 |
| #28 | 13.44 | 10.08 | 43.67 | 1.00 | 7.87 | 5.10 | 18.85 | 100.00 |
| #29 | 13.23 | 9.92 | 43.00 | 1.00 | 7.78 | 5.04 | 20.02 | 100.00 |
| #30 | 13.35 | 10.01 | 43.39 | 1.00 | 7.82 | 5.07 | 19.37 | 100.00 |

TABLE 11

| Sample | SHMP (wt. %) | $H_2O_2$ (wt. %) | Fiber (wt. %) | W/C | NaOH (M) | Initial set (min) | Density (kg/m³) | Compressive strength psi | Compressive strength MPa |
|---|---|---|---|---|---|---|---|---|---|
| #26 | 0.85 | 2.25 | 0.25 | 0.25 | 8.25 | 43 | 574 | 649 | 4.47 |
| #27 | 0.85 | 1.75 | 0.35 | 0.24 | 8.37 | >38 | 644 | 835 | 5.76 |
| #28 | 0.85 | 1.75 | 0.20 | 0.23 | 8.73 | 32 | ND | ND | ND |
| #29 | 0.85 | 1.85 | 0.30 | 0.25 | 8.13 | 34 | 638 | 806 | 5.56 |
| #30 | 0.85 | 2.15 | 0.20 | 0.24 | 8.44 | 31 | 596.69 | 610 | 4.21 |

ND = Not determined

Example 10

To prepare the GCCC for thermal insulation applications, an alkaline activator solution (modulus ~1.6) was prepared by mixing sodium hydroxide solution and Ru™ sodium silicate solution (PQ Inc) such that the following concentrations were obtained in the GCCC composition:
  $Na_2O$ (5.04 wt. %)
  $SiO_2$ (7.78 wt. %), and
  $H_2O$ (19.73 wt. %).

The blend of following blend of three constituents were added to the alkaline activator solution with sodium hexametaphosphate (SHMP) dissolved in it:
  Brandon Shore Class F fly ash (13.29 wt. %)
  Ground granulated blast furnace slag as hardening enhancer (43.19 wt. %), and
  Synthetic polypropylene fiber (0.03 wt. % of the GCCC composition).

Mixing lasted for 3 minutes.

Example 11

To prepare the GCCC for thermal insulation applications, an alkaline activator solution (modulus ~1.56) was prepared by mixing sodium hydroxide solution and Ru™ sodium silicate solution (PQ Inc) such that the following concentrations were obtained in the GCCC composition:
  $Na_2O$ (4.92 wt. %)
  $SiO_2$ (7.66 wt. %), and
  $H_2O$ (19.07 wt. %).

Sodium hexametaphosphate (SHMP) as a set retarder was dissolved in the alkaline activator solution in the amount of 1.00 wt. % of the GCCC composition. The alkaline activator solution with sodium hexametaphosphate in it was mixed with metakaolin (6.73 wt. %) in an intensive mixer (20L K-Lab Mixer from Lancaster Products) for 12 minutes.

Subsequently the following constituents were added and mixed for 3 minutes:

Brandon Shore Class F fly ash (13.47 wt. %)
Ground granulated blast furnace slag as hardening enhancer (47.14 wt. %), and
Synthetic polypropylene fiber (0.2 wt. % of the GCCC composition).

Then, silica fume (1.00 wt. %) as submicron filler was added under continued mixing for another 3 minutes. 30 seconds before end of mixing, 35% hydrogen peroxide solution was added as a foaming agent into the mixture in the amount of 2.00 wt. % of the GCCC composition. The paste was poured in a 3"×6" cylindrical mold, allowed to expand and fill the mold, and subsequently cured at room temperature. After 24 hours, the sample was de-molded and stored at room temperature. After curing for 28 days, the apparent density was determined to be 658 kg/m$^3$ and the compressive strength was measured to be 704 psi or 4.85 MPa (Sample #31, Tables 12 and 13).

Additional GCCC samples were prepared with the same geopolymer composite composition and procedure in Sample #31 but the paste was poured into a 4"×4"×16" beam mold. Compositions, apparent densities and compressive strengths of the additional samples are given in Tables 12 and 13.

TABLE 12

| | GCCC composition (wt. %) | | | | | | | |
|---|---|---|---|---|---|---|---|---|
| Sample | FFA | MK | BFS | SF | SiO$_2$ | Na$_2$O | Water | Sum |
| #31 | 13.47 | 6.73 | 47.14 | 1.00 | 7.66 | 4.92 | 19.07 | 100.00 |
| #32 | 13.49 | 6.74 | 47.21 | 1.00 | 7.68 | 4.93 | 18.95 | 100.00 |
| #33 | 13.45 | 6.73 | 47.09 | 1.00 | 7.66 | 4.92 | 19.16 | 100.00 |
| #34 | 13.34 | 6.67 | 46.70 | 0.99 | 7.59 | 4.88 | 19.82 | 100.00 |

TABLE 13

| Sample | SHMP (wt. %) | H$_2$O$_2$ (wt. %) | Fiber (wt. %) | W/C | NaOH (M) | Initial set (min) | Density (kg/m$^3$) | Compressive strength psi | MPa |
|---|---|---|---|---|---|---|---|---|---|
| #31 | 1.00 | 2.00 | 0.20 | 0.24 | 8.33 | 30 | 658 | 704 | 4.85 |
| #32* | 0.90 | 1.75 | 0.25 | 0.23 | 8.40 | 42 | ND | ND | ND |
| #33* | 0.90 | 1.75 | 0.35 | 0.24 | 8.29 | 32 | ND | ND | ND |
| #34* | 0.70 | 1.85 | 0.35 | 0.25 | 7.94 | 19 | ND | ND | ND |

*The alkaline activator solution was mixed with all dry components together.
ND = Not determined Example 12

To prepare the GCCC for thermal insulation applications, an alkaline activator solution (modulus ~1.39) was prepared by mixing sodium hydroxide solution and Ru™ sodium silicate solution (PQ Inc) such that the following concentrations were obtained in the GCCC composition:

Na$_2$O (5.02 wt. %)
SiO$_2$ (6.97 wt. %), and
H$_2$O (19.25 wt. %).

Sodium hexametaphosphate (SHMP) as a set retarder was dissolved in the alkaline activator solution in the amount of 0.90 wt. % of the GCCC composition. The alkaline activator solution with sodium hexametaphosphate first mixed with metakaolin (6.88 wt. %) in an intensive mixer (20L K-Lab Mixer from Lancaster Products) for 12 minutes.

Subsequently the following dry constituents were added and mixed for 6 minutes:

Brandon Shore Class F fly ash (20.63 wt. %)
Ground granulated blast furnace slag as hardening enhancer (41.25 wt. %), and
Synthetic polypropylene fiber (0.3 wt. % of the GCCC composition).

1 minute before the end of mixing, 35% hydrogen peroxide solution was added as a foaming agent into the mixture in the amount of 2.50 wt. % of the GCCC composition. The paste was poured in a 3"×6" cylindrical mold, allowed to expand and fill the mold, and subsequently cured at room temperature. After 24 hours, the sample was de-molded and stored at room temperature. After curing for 28 days, the apparent density was determined to be 502 kg/m$^3$ and compressive strength was measured to be 445 psi or 3.07 MPa (Sample #35, Tables 14 and 15).

Additional GCCC samples were prepared with the same composite binder composition and procedure in Sample #35. Compositions, apparent densities and compressive strengths of the additional samples are given in Tables 14 and 15.

TABLE 14

| | GCCC composition (wt. %) | | | | | | | |
|---|---|---|---|---|---|---|---|---|
| Sample | FFA | MK | BFS | SF | SiO$_2$ | Na$_2$O | Water | Sum |
| #35 | 20.63 | 6.88 | 41.25 | 0.00 | 6.97 | 5.02 | 19.25 | 100.00 |
| #36 | 20.63 | 6.88 | 41.25 | 0.00 | 6.97 | 5.02 | 19.25 | 100.00 |
| #37 | 20.45 | 6.82 | 40.89 | 0.00 | 6.91 | 4.98 | 19.96 | 100.00 |
| #38 | 20.53 | 6.84 | 41.06 | 0.00 | 6.94 | 5.00 | 19.62 | 100.00 |

TABLE 15

| Sample | SHMP (wt. %) | H$_2$O$_2$ (wt. %) | Fiber (wt. %) | W/C | NaOH (M) | Initial set (min) | Density (kg/m$^3$) | Compressive strength psi | MPa |
|---|---|---|---|---|---|---|---|---|---|
| #35 | 0.90 | 2.50 | 0.30 | 0.24 | 8.42 | 35 | 502 | 445 | 3.07 |
| #36 | 0.12 | 2.50 | 0.30 | 0.24 | 8.42 | 36 | 532 | 324 | 2.23 |

TABLE 15-continued

| Sample | SHMP (wt. %) | H$_2$O$_2$ (wt. %) | Fiber (wt. %) | W/C | NaOH (M) | Initial set (min) | Density (kg/m$^3$) | Compressive strength psi | MPa |
|---|---|---|---|---|---|---|---|---|---|
| #37 | 0.90 | 0.185** | 0.30 | 0.25 | 8.05 | 56 | ND | ND | ND |
| #38* | 1.90 | 1.85 | 0.30 | 0.24 | 8.23 | 21 | ND | ND | ND |

*The alkaline activator solution was mixed with all dry components together.
Calcium nitrate and sodium sulfate in a mass ratio of 1:5 were added a set retarder.
**Aluminum powder (20 μm size) as the foaming agent.
35 and #37 were prepared by pouring the paste into 4" × 4" × 16" beam molds.

Example 13

To prepare the GCCC for thermal insulation applications, an alkaline activator solution (modulus ~1.39) was prepared by mixing sodium hydroxide solution and Ru™ sodium silicate solution (PQ Inc) such that the following concentrations were obtained in the GCCC composition:
Na$_2$O (5.73 wt. %)
SiO$_2$ (7.98 wt. %), and
H$_2$O (19.28 wt. %).

Sodium hexametaphosphate (SHMP) as a set retarder was dissolved in the alkaline activator solution in the amount of 0.85 wt. % of the GCCC composition. The alkaline activator solution with sodium hexametaphosphate was mixed with metakaolin (10.05 wt. %) in an intensive mixer (20L K-Lab Mixer from Lancaster Products) for 12 minutes.

Subsequently the following constituents were added and mixed for 6 minutes:
SEFA Class F fly ash (20.10 wt. %)
Ground granulated blast furnace slag as hardening enhancer (36.86 wt. %), and
Synthetic polypropylene fiber (0.03 wt. % of the GCCC composition).

30 seconds before end of mixing, 35% hydrogen peroxide solution was added as a foaming agent into the mixture in the amount of 1.85 wt. % of the GCCC composition. The paste was poured in a 3"×6" cylindrical mold, allowed to expand and fill the mold, and subsequently cured at room temperature. After 24 hours, the sample was de-molded and stored at room temperature. After curing for 28 days, the apparent density was determined to be 566 kg/m$^3$ and the compressive strength was measured to be 619 psi or 4.27 MPa (Sample #39, Tables 16 and 17).

Additional GCCC samples were prepared with the same composite binder composition and procedure in Sample #39, except that the paste was poured into a 4"×4"×16" beam mold. Brandon Shore Class F fly ash was used to prepare additional GCCC samples. Up to 3 times volumetric increases were observed in all additional samples. Compositions, apparent densities and compressive strengths of the additional samples are given in Tables 16 and 17.

TABLE 16

| | GCCC composition (wt. %) | | | | | | | |
|---|---|---|---|---|---|---|---|---|
| Sample | FFA | MK | BFS | SF | SiO$_2$ | Na$_2$O | Water | Sum |
| #39 | 20.10 | 10.05 | 36.86 | 0.00 | 7.98 | 5.73 | 19.28 | 100.00 |
| #40 | 19.47 | 9.74 | 35.70 | 0.00 | 7.72 | 5.55 | 21.83 | 100.00 |
| #41 | 19.60 | 9.80 | 35.94 | 0.00 | 7.78 | 5.58 | 21.29 | 100.00 |
| #42 | 19.60 | 9.80 | 35.94 | 0.00 | 7.78 | 5.58 | 21.29 | 100.00 |
| #43 | 19.86 | 9.93 | 36.41 | 0.00 | 7.88 | 5.66 | 20.26 | 100.00 |
| #44 | 19.79 | 9.90 | 36.28 | 0.00 | 7.85 | 5.64 | 20.54 | 100.00 |
| #45 | 19.81 | 9.91 | 36.33 | 0.00 | 7.86 | 5.64 | 20.45 | 100.00 |
| #46 | 19.96 | 9.98 | 36.59 | 0.00 | 7.92 | 5.69 | 19.88 | 100.00 |

TABLE 17

| Sample | SHMP (wt. %) | H$_2$O$_2$ (wt. %) | Fiber (wt. %) | W/C | NaOH | Initial set (min) | Density (kg/m$^3$) | Compressive strength psi | MPa |
|---|---|---|---|---|---|---|---|---|---|
| #39 | 0.85 | 1.85 | 0.30 | 0.24 | 9.58 | >32 | 565.63 | 619 | 4.27 |
| #40 | 0.85 | 1.75 | 0.30 | 0.28 | 8.20 | 52 | ND | ND | ND |
| #41 | 0.85 | 1.85 | 0.30 | 0.27 | 8.46 | 63 | ND | ND | ND |
| #42 | 0.85 | 1.85 | 0.30 | 0.27 | 8.46 | 90 | ND | ND | ND |
| #43 | 0.85 | 1.85 | 0.30 | 0.25 | 9.10 | 65 | ND | ND | ND |
| #44 | 0.85 | 2.50 | 0.30 | 0.26 | 8.86 | 60 | ND | ND | ND |
| #45 | 0.85 | 2.90 | 0.30 | 0.26 | 8.91 | 85 | ND | ND | ND |
| #46 | 0.85 | 2.00 | 0.30 | 0.25 | 9.23 | 26 | 541.80 | 529 | 3.65 |

Additional GCCC samples were prepared with the same composite binder composition and procedure described in Sample #39 except that no set retarder was used. Either Brandon Shore or SEFA Class F fly ash was used to prepare additional GCCC samples. Mix characteristics, apparent density and compressive strength of the additional samples are shown in Tables 18 and 19.

TABLE 18

| | GCCC composition | | | | | | | |
|---|---|---|---|---|---|---|---|---|
| Sample | FFA | MK | BFS | SF | SiO$_2$ | Na$_2$O | Water | Sum |
| #47 | 19.92 | 9.96 | 36.52 | 0.00 | 7.90 | 5.67 | 20.02 | 100.00 |
| #48 | 19.95 | 9.98 | 36.58 | 0.00 | 7.92 | 5.68 | 19.89 | 100.00 |
| #49 | 19.76 | 9.88 | 36.23 | 0.00 | 7.84 | 5.63 | 20.65 | 100.00 |

TABLE 19

| Sample | SHMP (wt %) | H$_2$O$_2$ (wt %) | Fiber (wt %) | W/C | NaOH (M) | Initial Set | Density (kg/m$^3$) | Compressive strength psi | Compressive strength MPa |
|---|---|---|---|---|---|---|---|---|---|
| #47* | 0 | 2.50 | 0.30 | 0.25 | 9.14 | 48 min | 513 | 518 | 3.57 |
| #48** | 0 | 1.85 | 0.30 | 0.24 | 9.22 | 34 min | 597 | 479 | 3.30 |
| #49** | 0 | 2.15 | 0.30 | 0.26 | 8.80 | 35 min | 557 | 613 | 4.23 |

*SEFA fly ash;
**Brandon Shore fly ash

Example 14

To prepare the GCCC for thermal insulation applications, an alkaline activator solution (Modulus=1.39) was prepared by mixing sodium hydroxide solution and Ru™ sodium silicate solution (PQ Inc) to obtain weight percents of the following components in the GCCC composition:
Na$_2$O (5.72 wt %)
SiO$_2$ (7.97 wt %), and
H$_2$O (19.39 wt %).

Borax as a set retarder was dissolved in the alkaline activator solution in the amount of 0.85 wt % of the GCCC composition. The alkaline activator solution dissolved with borax was first mixed with metakaolin (10.04 wt %) in an intensive mixer (20L K-Lab Mixer from Lancaster Products) for 12 minutes.

Subsequently the following constituents were added and mixed for 3 minutes:
Brandon Shore Class F fly ash (20.08 wt %)
Ground granulated blast furnace slag as hardening enhancer (36.81 wt %), and
Synthetic polypropylene fiber (0.03 wt % of the GCCC composition).

75 seconds toward ending of mixing, 35% hydrogen peroxide solution was added as a foaming agent into the mixture in the amount of 1.85 wt % of the GCCC composition. The paste was poured in a 3"×6" cylindrical mold, allowed to expand to fill the mold, and subsequently cured at room temperature. After 24 hours, the sample was de-molded and stored at room temperature. After curing for 28 days, the apparent density was determined to be 561 kg/m$^3$ and compressive strength was measured to be 687 psi or 4.74 MPa (Sample #50, Tables 20 and 21).

Additional GCCC samples were prepared with the same composite binder composition and procedure described in Sample #50. Borax was used as the set retarder throughout all the additional samples. Either Brandon Shore or SEFA Class F fly ash was used to prepare additional GCCC samples. Samples #54 and 55 were estimated to have a volumetric expansion about 3 to 4 times. Mix characteristics, apparent density and compressive strength of the additional samples are shown in Tables 20 and 21.

TABLE 20

| | GCCC composition | | | | | | | |
|---|---|---|---|---|---|---|---|---|
| Sample | FFA | MK | BFS | SF | SiO$_2$ | Na$_2$O | Water | Sum |
| #50 | 20.08 | 10.04 | 36.81 | 0.00 | 7.97 | 5.72 | 19.39 | 100.00 |
| #51 | 20.10 | 10.05 | 36.85 | 0.00 | 7.97 | 5.73 | 19.30 | 100.00 |
| #52 | 20.09 | 10.04 | 36.83 | 0.00 | 7.97 | 5.72 | 19.35 | 100.00 |
| #53 | 20.06 | 10.03 | 36.78 | 0.00 | 7.96 | 5.72 | 19.44 | 100.00 |
| #54 | 19.92 | 9.96 | 36.51 | 0.00 | 7.90 | 5.67 | 20.04 | 100.00 |
| #55 | 19.91 | 9.96 | 36.51 | 0.00 | 7.90 | 5.67 | 20.05 | 100.00 |

TABLE 21

| Sample | Borax (wt %) | H$_2$O$_2$ (wt %) | Fiber (wt %) | W/C | NaOH (M) | Initial set | Density (kg/m$^3$) | Compressive strength psi | Compressive strength MPa |
|---|---|---|---|---|---|---|---|---|---|
| #50* | 0.85 | 1.85 | 0.30 | 0.24 | 9.52 | 91 min | 561 | 687 | 4.74 |
| #51** | 0.85 | 1.50 | 0.30 | 0.24 | 9.57 | 96 min | 625 | 882 | 6.08 |
| #52** | 0.85 | 1.20 | 0.30 | 0.24 | 9.54 | 120 min | 726 | 1472 | 10.15 |
| #53* | 0.85 | 2.15 | 0.30 | 0.24 | 9.49 | 73 min | 492 | 451 | 3.11 |
| #54* | 0.85 | 2.50 | 0.30 | 0.25 | 9.14 | 90 min | ND | ND | ND |
| #55* | 0.85 | 1.75# | 0.30 | 0.25 | 9.13 | 33 min | ND | ND | ND |

*Brandon Shore fly ash;
**SEFA fly ash;
Additionally metal aluminum powder was added together with hydrogen peroxide in the amount of 0.05 wt % of the GCCC composition.

Example 15

To prepare the GCCC for thermal insulation applications, an alkaline activator solution (Modulus=1.39) was prepared by mixing sodium hydroxide solution and Ru™ sodium silicate solution (PQ Inc) to obtain weight percents of the following components in the GCCC composition: Na$_2$O (5.60 wt %) SiO$_2$ (7.80 wt %), and H$_2$O (17.71 wt %).

The alkaline activator solution (no retarder was used) was first mixed with metakaolin (20.36 wt %) in an intensive mixer (20L K-Lab Mixer from Lancaster Products) for 10 minutes.

Subsequently the following constituents were added and mixed for 6 minutes: SEFA Class F fly ash (40.72 wt %), ground granulated blast furnace slag as hardening enhancer (6.79 wt %), and synthetic polypropylene fiber (0.03 wt % of the GCCC composition)

At 45 seconds toward ending of mixing, metal aluminum powder (20 μm median size) was added as a foaming agent into the mixture in the amount of 1.85 wt % of the GCCC composition. The paste was poured in a 3"×6" cylindrical mold, allowed to expand to fill the mold, and subsequently cured at room temperature. After 24 hours, the sample was de-molded and stored at room temperature. After curing for 28 days, the apparent density was determined to be 689 kg/m$^3$ and compressive strength was measured to be 751 psi or 5.18 MPa (Sample #56, Tables 22 and 23).

Sample #57 was prepared with the same procedure described in Sample #58 but with a different composite binder composite and no retarder was added. Samples #58 and 59 were prepared in the same procedure described in Sample #56 except that borax was used as the set retarder. Mix characteristics, apparent density and compressive strength of all the samples are shown in Tables 22 and 23.

TABLE 22

| | GCCC composition | | | | | | | |
|---|---|---|---|---|---|---|---|---|
| Sample | FFA | MK | BFS | SF | SiO$_2$ | Na$_2$O | Water | Sum |
| #56 | 40.72 | 20.36 | 6.79 | 1.02 | 7.80 | 5.60 | 17.71 | 100.00 |
| #57 | 47.57 | 13.59 | 6.80 | 1.02 | 7.81 | 5.61 | 17.61 | 100.00 |
| #58 | 27.65 | 34.56 | 6.91 | 0.00 | 7.95 | 5.71 | 17.22 | 100.00 |
| #59 | 48.38 | 13.82 | 6.91 | 0.00 | 7.95 | 5.71 | 17.22 | 100.00 |

TABLE 23

| Sample | Borax (wt %) | H$_2$O$_2$ (wt %) | Al (wt %) | Fiber (wt %) | W/C | NaOH (M) | Initial set | Density (kg/m$^3$) | Compressive strength psi | Compressive strength MPa |
|---|---|---|---|---|---|---|---|---|---|---|
| #56 | 0.85 | — | 0.185 | 0.30 | 0.22 | 10.21 | 46 min | 689 | 751 | 5.18 |
| #57 | 0.85 | — | 0.185 | 0.30 | 0.21 | 10.28 | 35 min | 656 | 559 | 3.85 |
| #58 | 0.85 | 1.85 | — | 0.30 | 0.21 | 10.70 | >46 min | ND | ND | ND |
| #59 | 0.85 | 1.85 | — | 0.30 | 0.21 | 10.70 | N/A | 531 | 362 | 2.50 |

Example 16

To prepare the GCCC for thermal insulation applications, the following dry ingredients were first mixed:
Orlando Class F fly ash (54.77 wt. %)
Ground granulated blast furnace slag as hardening enhancer (5.00 wt. %), and
Metakaolin (5.00 wt. %)
Then an alkaline activator solution (Modulus ~1.05) was prepared by mixing sodium hydroxide solution and Ru™ sodium silicate solution (PQ Inc) to obtain weight percents of the following components in the GCCC composition:
Na$_2$O (5.58 wt %)
SiO$_2$ (5.88 wt %), and
H$_2$O (20.77 wt %).

The activator solution was mixed in a 7-quart planetary mixer for 3 minutes. Then silica fume (3 wt %) as submicron filler was added and continued mixing for 3 minutes. Metal aluminum powder (0.08 wt % of the GCCC composition) was added and continued mixing for another 3 minutes. The paste was poured in a 2"×4" cylindrical mold, allowed to expand to fill the mold, and cured at and 70° C. for 24 hours. After 24 hours, the sample was de-molded and stored at room temperature. After curing for 28 days, the apparent density was determined to be 923 g/m$^3$ and compressive strength was measured to be 881 psi or 6.07 MPa (Sample #60, Tables 24 and 25).

More GCCC samples with similar composition were prepared with the same procedure described in Sample #60. Mix characteristics, apparent density and compressive strength of the additional samples are shown in Tables 24 and 25.

TABLE 24

| | GCCC composition | | | | | | | |
|---|---|---|---|---|---|---|---|---|
| Sample | FFA | MK | BFS | SF | SiO$_2$ | Na$_2$O | Water | Sum |
| #60 | 54.77 | 5.00 | 5.00 | 3.00 | 5.88 | 5.58 | 20.77 | 100.00 |
| #61 | 53.37 | 7.44 | 4.87 | 2.92 | 5.73 | 5.44 | 20.23 | 100.00 |
| #62 | 53.98 | 6.40 | 4.93 | 2.96 | 5.79 | 5.50 | 20.45 | 100.00 |
| #63 | 54.06 | 8.40 | 4.93 | 0.82 | 5.80 | 5.51 | 20.48 | 100.00 |

TABLE 25

| Sample | Curing T (° C.) | Al (wt %) | W/C | NaOH (M) | Density (kg/m$^3$) | Compressive strength psi | Compressive strength MPa |
|---|---|---|---|---|---|---|---|
| #60 | 70 | 0.08 | 0.26 | 8.67 | 923 | 881 | 6.07 |
| #61 | 70 | 0.06 | 0.25 | 8.67 | 844 | 403 | 2.78 |

TABLE 25-continued

| Sample | Curing T (° C.) | Al (wt %) | W/C | NaOH (M) | Density (kg/m$^3$) | Compressive strength psi | Compressive strength MPa |
|---|---|---|---|---|---|---|---|
| #62 | 50 | 0.04 | 0.26 | 8.67 | 907 | 813 | 5.61 |
| #63 | 70 | 0.02 | 0.26 | 8.68 | 1136 | 1853 | 12.78 |

Figure 3:
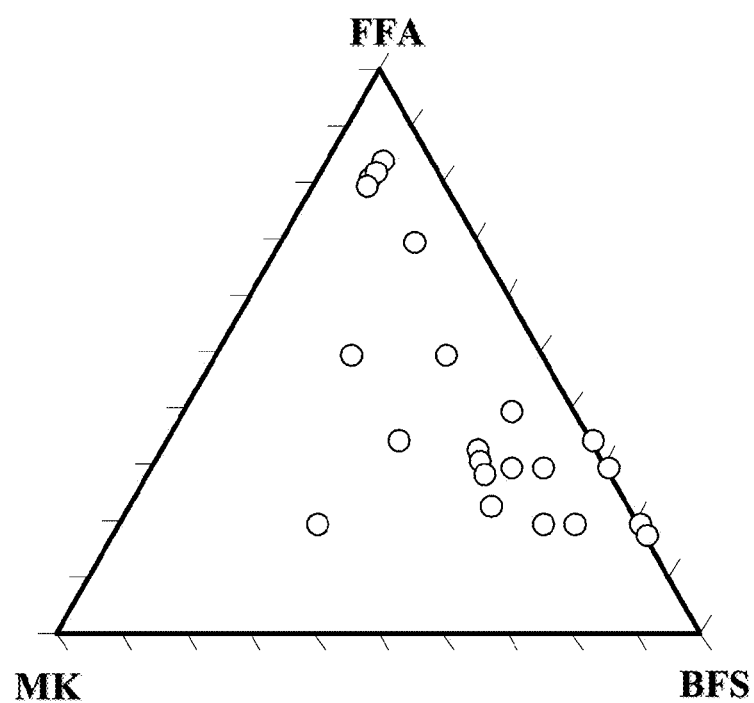
FIG. 3 shows a ternary composition diagram of geopolymer composite binders for cellular concrete.
Figure 4:
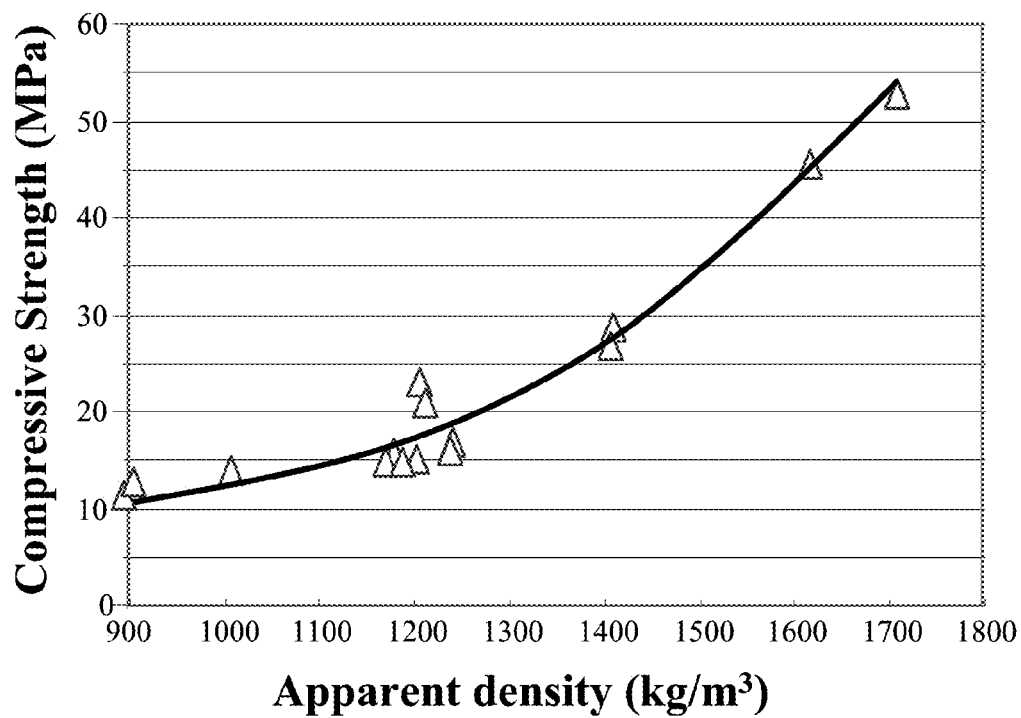
FIG. 4 is a graph showing compressive strength of a geopolymer composite cellular concrete product for structural applications as a function of apparent product density according to one embodiment of the present invention.
Figure 5:
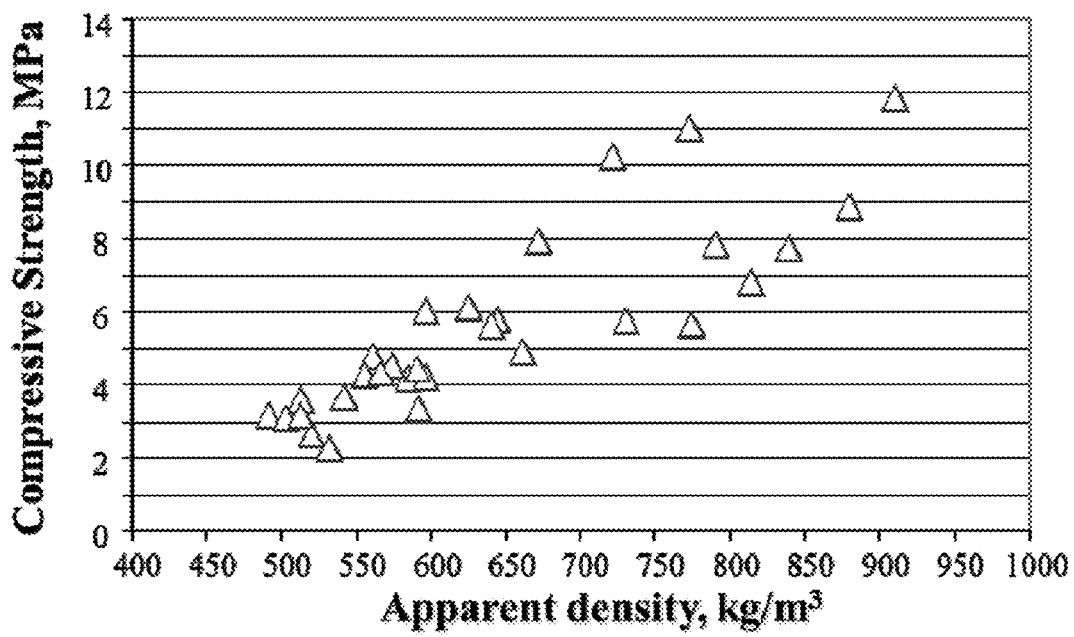
FIG. 5 is a graph showing compressive strength of a geopolymer composite cellular concrete product for thermal insulation as a function of the products' apparent density according to one embodiment of the present invention.

Selected compositions of the ternary geopolymer composite binders exemplified by Examples 1 to 16 are shown in FIG. 3.

REFERENCES

The following references are referred to above and are incorporated herein by reference:
1. Esmaily, H. and H. Nuranian, Non-autoclaved high strength cellular concrete from alkali activated slag, Construction and Building Materials, 26 (1), 200-206 (2012).
2. Vlček, J., H. Eleková, V. Tomková, V. Matěkja, and F. Ovčačik, Lightweight materials based on slag from production of iron and steel (published on-line) (2010).
3. Aguilar, R. A., O. B. Diaz, J. I. Escalante Garcia, Lightweight concretes of activated metakaolin-fly ash binders, with blast furnace slag aggregates, Construction and Building Materials, 24 (7), 1166-1175 (2010).
4. Joseph Henon, J., A. Alzina, J. Absi, D. S. Smith, and S. Rossignol, Potassium geopolymer foams made with silica fume pore forming agent for thermal insulation, Journal of Porous Materials, 20(1), 37-46 (2013).
5. U.S. Pat. No. 5,605,570, Alkali-activated glassy silicate foamed concrete (1997).
6. U.S. Patent Application: 2012/0024196, Tailored geopolymer composite binders for cement and concrete applications (2012).
7. U.S. Patent Application: 2012/0152153, Geopolymer composite for ultra high performance concrete (2012).

All documents, patents, journal articles and other materials cited in the present application are incorporated herein by reference.

While the present invention has been disclosed with references to certain embodiments, numerous modification, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A product comprising:
   a geopolymer composite binder comprising:
      one or more Class F fly ash materials,
      one or more gelation enhancers, and
      one or more hardening enhancers,
   one or more alkaline activators,
   one or more aggregates,
   one or more fiber materials, and
   one or more foaming agents,
   wherein each of the one or more Class F fly ash materials comprises 15 wt % or less calcium oxide,
   wherein each of the one or more alkaline activators comprise an alkaline activator solution comprising one or more metal hydroxides, one or more metal silicates and water,
   wherein the product is a geopolymer composite cellular concrete (GCCC),
   wherein the GCCC is a Portland cement-free concrete,
   wherein the one or more fiber materials comprise 0 to about 5 wt. % of the product,
   wherein the one or more foaming agents comprise aluminum powder,
   wherein the aluminum powder comprises 0.010 to 0.08 wt. % of the product, and
   wherein the product has an apparent density of about 1200 kg/m$^3$ to about 1800 kg/m$^3$ and a 28-day compressive strength of at least about 17 MPa or 2500 psi.

2. The product of claim 1, wherein the one or more Class F fly ash materials comprise about 5 to about 92 wt. % of the geopolymer composite binder, the one or more gelation enhancers comprise about 3 to about 60 wt. % of the geopolymer composite binder, and the one or more hardening enhancers amount to about 5 to about 92 wt. % of the geopolymer composite binder.

3. The product of claim 1, wherein the one or more gelation enhancers are selected from the group consisting of: metakaolin, metahalloysite, micron and nanoparticles of silica and alumina, and any pozzolanic aluminosilicate materials that have a low alkali-earth oxide content and that have a high dissolution rate in alkaline solution.

4. The product of claim 1, wherein the one or more gelation enhancers comprise metakaolin.

5. The product of claim 1, wherein the one or more hardening enhancers are selected from the group consisting of: ground granulated blast furnace slag, Class C fly ash, vitreous calcium aluminosilicate, kiln dust, CaO-rich pozzolanic aluminosilicates, and combinations thereof.

6. The product of claim 1, wherein the one or more hardening enhancers comprise one or both members of the group consisting of: blast furnace slag and Class C fly ash.

7. The product of claim 1, wherein one or more Class F fly ash materials comprise about 1 to about 50 wt. % of the product.

8. The product of claim 1, wherein one or more Class F fly ash materials comprise about 10 to about 30 wt. % of the product.

9. The product of claim 1, wherein the one or more gelation enhancers comprise about 1 to about 50 wt. % of the product.

10. The product of claim 1, wherein the one or more gelation enhancers comprise about 8 to about 25 wt. % of the product.

11. The product of claim 1, wherein the one or more hardening enhancers comprise about 1 to about 50 wt. % of the product.

12. The product of claim 1, wherein the one or more hardening enhancers comprise about 10 to about 35 wt. % of the product.

13. The product of claim 1, wherein, the one or more metal hydroxides comprise one or both members of the group consisting of: sodium hydroxide and potassium hydroxide, and wherein the metal hydroxides as alkali-metal oxides, comprises about 2 to about 12 wt. % of the product.

14. The product of claim 1, wherein, the one or more metal hydroxides comprise one or both members of the group consisting of: sodium hydroxide and potassium hydroxide, and wherein the metal hydroxides as metal oxides comprise about 3.5 to about 8 wt. % of the product.

15. The product of claim 1, wherein the one or more metal silicates comprise one or both members of the group consisting of sodium silicate and potassium silicate, and wherein the metal silicate as soluble silica comprises about 2 to about 15 wt. % of the product.

16. The product of claim 1, wherein the one or more metal silicates comprise one or both members of the group consisting of: sodium silicate and potassium silicate, and wherein the metal silicate as a soluble silica comprises about 3.5 to about 8 wt. % of the product.

17. The product of claim 1, wherein the alkaline activator solution comprises about 10 to about 50 wt. % of the product.

18. The product of claim 1, wherein the alkaline activator solution comprise about 15 to about 35 wt. % of the product.

19. The product of claim 1, wherein the water in the alkaline activator solution comprises about 6 to about 25 wt. % of the product.

20. The product of claim 1, wherein the water of the alkaline activator solution comprises about 8 to about 16 wt. % of the product.

21. The product of claim 1, wherein the one or more foaming agents comprise aluminum powder having a particle size of between 1 and 75 μm.

22. The product of claim 1, wherein the aluminum powder comprises about 0.02 wt. % of the product.

23. The product of claim 1, wherein the one or more aggregates have a particle size of from about 0.025 to about 20 mm, and wherein the one or more aggregates comprise about 1 to 70 wt. % of the product.

24. The product of claim 1, wherein the one or more aggregates have a particle size of between about 0.025 and 20 mm, and wherein the one or more aggregates comprise about 10 to 50 wt. % of the product.

25. The product of claim 1, wherein the one or more aggregates comprise aggregates selected from the group consisting of: river sand, limestone and calcined bauxite sand.

26. The product of claim 1, wherein the one or more aggregates comprise one or more fine or coarse lightweight aggregates comprising: expanded slag, expanded slate, expanded shale, expanded clay, expanded perlite, pumice, scoria, and expanded pelletized fly ash and wherein the one or more lightweight aggregates each have a density of about 50 kg/m$^3$ to about 1000 kg/m$^3$.

27. The product of claim 1, wherein the product further comprises one or more ultrafine and/or submicron fillers and wherein the one or more ultrafine and/or submicron fillers comprise from about 1 to about 12 wt. % of the product.

28. The product of claim 1, wherein the product further comprises one or more ultrafine and/or submicron fillers and wherein the one or more ultrafine and/or submicron fillers comprise from about 2 to about 5 wt. % of the product.

29. The product of claim 28, wherein the product further comprises one or more ultrafine and/or submicron fillers having a particle size of between 0.01 and 10 μm and wherein the one or more ultrafine and/or submicron fillers are selected from the group consisting of: gray silica fume, white silica fume, precipitated silica, ultrafine calcium carbonate, ultrafine furnace slag, and ultrafine fly ash and submicron particles of metal oxides.

30. The product of claim 1, wherein the product further comprises one or more set retarders selected from the group consisting of sodium metaphosphate, phosphoric acid, borax, boric acid, alkali citrates, barium hydroxide, barium nitrate, barium chloride, zinc nitrate, and gypsum.

31. The product of claim 30, wherein the one or more set retarders comprise less than about 5 wt. % of the product.

32. The product of claim 30, wherein the one or more set retarders comprise about 0.5 to 2 wt. % of the product.

33. The product of claim 30, wherein the product comprises a set retarder selected from the group consisting of borax, barium chloride, barium nitrate, and sodium metaphosphate.

34. The product of claim 1, wherein the one or more fiber materials are selected from group consisting of organic fiber, glass fiber, mineral fiber, basalt fiber, and carbon fiber.

35. The product of claim 34, wherein the one or more fiber materials comprise 0.1 to 0.5 wt. % of the product.

36. The product of claim 34, wherein the one or more fiber materials comprise about 0.25 to 2.5 wt. % of the product.

37. The product of claim 1, wherein the one or more fiber materials comprise at least 0.5 wt. % of the product.

38. The product of claim 1, further comprising:
one or more accelerators selected from the group consisting of alkali fluorides and alkali oxalates.

39. The product of claim 1, further comprising:
a superplasticizer solid,
wherein the superplasticizer solid is a polycarboxylic compound.

40. The product of claim 39, wherein the superplasticizer solid comprises no more than 1 wt. % of the product.

41. A product comprising:
a geopolymer composite binder comprising:
one or more Class F fly ash materials,
one or more gelation enhancers, and
one or more hardening enhancers,
one or more alkaline activators,
one or more fiber materials, and
one or more foaming agents,
wherein each of the one or more Class F fly ash materials comprises 15 wt % or less calcium oxide,
wherein the one or more fiber materials comprise 0 to about 5 wt. % of the product,
wherein the one or more foaming agents comprise aluminum powder,
wherein the aluminum powder comprises 0.010 to 0.08 wt. % of the product,
wherein the product has an apparent density of about 400 kg/m$^3$ to about 1200 kg/m$^3$ and a 28-day compressive strength of about 3 to about 17 MPa,
wherein the product is a geopolymer composite cellular concrete (GCCC), and
wherein the GCCC is a Portland cement-free concrete.

42. The product of claim 41, wherein the one or more Class F fly ash materials comprise about 2 to about 60 wt. % of the product.

43. The product of claim 41, wherein the one or more Class F fly ash materials comprise about 10 to about 50 wt % of the product.

44. The product of claim 41, wherein the one or more gelation enhancers comprise about 2 to about 60 wt. % of the product.

45. The product of claim 41, wherein the one or more gelation enhancers comprise about 3 to about 25 wt. % of the product.

46. The product of claim 41, wherein the one or more hardening enhancers comprise about 2 to about 60 wt. % of the product.

47. The product of claim 41, wherein the one or more hardening enhancers comprise about 10 to about 50 wt. % of the product.

48. The product of claim 41, wherein the one or more alkaline activators comprise an alkaline activator solution comprising one or more metal hydroxides, one or more metal silicates, and water.

49. The product of claim 48, wherein the one or more metal hydroxides comprise one or both members of the group consisting of sodium hydroxide and potassium hydroxide, and wherein the one or more metal hydroxides, as alkali oxides, comprises about 2 to about 12 wt. % of the product.

50. The product of claim 48, wherein the one or more metal hydroxides comprise one or both members of the group consisting of: sodium hydroxide and potassium hydroxide, and wherein the one or more metal hydroxides, as alkali oxides, comprises about 4 to about 8 wt. % of the product.

51. The product of claim 48, wherein the one or more metal silicates, as soluble silica, comprises about 2 to about 15 wt. % of the product.

52. The product of claim 48, wherein the one or more metal silicates, as soluble silica, comprises about 6 to about 10 wt. % of the product.

53. The product of claim 48, wherein the alkaline activator solution comprises about 14 to 55 wt. % of the product.

54. The product of claim 48, wherein the alkaline activator solution comprises about 25 to about 40 wt. %, of the product.

55. The product of claim 48, wherein the water in the alkaline activator solution comprises about 10 to about 30 wt. % of the product.

56. The product of claim 48, wherein the water in the alkaline activator solution comprises about 15 to about 22 wt. %, of the product.

57. The product of claim 41, wherein the one or more foaming agents comprise aluminum powder having a particle size of about 1 to about 75 μm.

58. The product of claim 41, wherein the aluminum powder comprises 0.025 to 0.08 wt. % of the product.

59. The product of claim 41, wherein the product further comprises one or more set retarders selected from the group consisting of sodium metaphosphate, phosphoric acid, borax, boric acid, alkali citrates, barium hydroxide, barium nitrate, barium chloride, zinc nitrate, and gypsum.

60. The product of claim 59, wherein the one or more set retarders comprise less than about 5 wt. % of the product.

61. The product of claim 59, wherein the one or more set retarders comprise about 0.5 to 2 wt. % of the product.

62. The product of claim 41, wherein the product comprises a set retarder selected from the group consisting of borax, barium chloride, barium nitrate, and sodium metaphosphate.

63. The product of claim 41, wherein the product further comprises one or more submicron fillers and wherein the one or more submicron fillers comprise gray and white silica fume.

64. The product of claim 63, wherein the one or more submicron fillers comprise about 1 to about 12 wt. % of the product.

65. The product of claim 63, wherein the one or more submicron fillers comprise about 1 to about 3 wt. % of the product.

66. The product of claim 41, wherein the one or more fiber materials are selected from group consisting of organic fiber, glass fiber, mineral fiber, basalt fiber, and carbon fiber.

67. The product of claim 41, wherein the one or more fiber materials comprise at least 0.30 wt. % of the product.

68. The product of claim 41, wherein the one or more fiber materials comprise about 0.25 to about 2.5 wt. % of the product.

69. The product of claim 41, wherein the product further comprises one or more accelerators selected from the group consisting of aluminum hydroxide, sodium or potassium carbonate, sodium sulfate, potassium sulfate, sodium oxalate, potassium oxalate, sodium fluoride and potassium fluoride, and wherein the one or more accelerators comprise up to about 5 wt. % of the product.

70. The product of claim 41, wherein the product further comprises one or more aggregates.

71. The product of claim 70, wherein the one or more aggregates have a particle size of between about 0.025 and 20 mm, and wherein the one or more aggregates comprise about 10 to 50 wt. % of the product.

72. The product of claim 70, wherein the product comprises one or more fine aggregates having particle sizes between about 0.005 and about 10 mm, and comprise about 1 to about 25 wt. % of the product.

73. The product of claim 72, wherein the one or more fine aggregates are selected from the group consisting of fine expanded perlite, pumice, cenosphere, and hollow glass powder.

74. A product comprising:
a geopolymer composite binder comprising:
one or more Class F fly ash materials,
one or more gelation enhancers, and
one or more hardening enhancers,
one or more alkaline activators,
one or more fiber materials, and
one or more foaming agents,
wherein each of the one or more Class F fly ash materials comprises 15 wt % or less calcium oxide,
wherein the one or more fiber materials comprise 0 to about 5 wt. % of the product,
wherein the one or more foaming agents comprises an 35-37 wt. % aqueous hydrogen peroxide solution comprising hydrogen peroxide,
wherein the hydrogen peroxide of the aqueous hydrogen peroxide solution comprises 0.10-3.00 wt. % of the product,
wherein the product has an apparent density of about 400 kg/m$^3$ to about 1200 kg/m$^3$ and a 28-day compressive strength of about 3 to about 17 MPa,
wherein the product is a geopolymer composite cellular concrete (GCCC), and
wherein the GCCC is a Portland cement-free concrete.

75. The product of claim 74, wherein the one or more Class F fly ash materials comprise about 2 to about 60 wt. % of the product.

76. The product of claim 74, wherein the one or more Class F fly ash materials comprise about 10 to about 50 wt % of the product.

77. The product of claim 74, wherein the one or more gelation enhancers comprise about 2 to about 60 wt. % of the product.

78. The product of claim 74, wherein the one or more gelation enhancers comprise about 3 to about 25 wt. % of the product.

79. The product of claim 74, wherein the one or more hardening enhancers comprise about 2 to about 60 wt. % of the product.

80. The product of claim 74, wherein the one or more hardening enhancers comprise about 10 to about 50 wt. % of the product.

81. The product of claim 74, wherein the one or more alkaline activators comprise an alkaline activator solution comprising one or more metal hydroxides, one or more metal silicates, and water.

82. The product of claim 81, wherein the one or more metal hydroxides comprise one or both members of the group consisting of sodium hydroxide and potassium hydroxide, and wherein the one or more metal hydroxides, as alkali oxides, comprises about 2 to about 12 wt. % of the product.

83. The product of claim 81, wherein the one or more metal hydroxides comprise one or both members of the group consisting of: sodium hydroxide and potassium hydroxide, and wherein the one or more metal hydroxides, as alkali oxides, comprises about 4 to about 8 wt. % of the product.

84. The product of claim 81, wherein the one or more metal silicates, as soluble silica, comprises about 2 to about 15 wt. % of the product.

85. The product of claim 81, wherein the one or more metal silicates, as soluble silica, comprises about 6 to about 10 wt. % of the product.

86. The product of claim 81, wherein the alkaline activator solution comprises about 14 to 55 wt. % of the product.

87. The product of claim 81, wherein the alkaline activator solution comprises about 25 to about 40 wt. %, of the product.

88. The product of claim 81, wherein the water in the alkaline activator solution comprises about 10 to about 30 wt. % of the product.

89. The product of claim 81, wherein the water in the alkaline activator solution comprises about 15 to about 22 wt. %, of the product.

90. The product of claim 74, wherein the aqueous hydrogen peroxide solution comprises a 35 wt. % hydrogen peroxide solution.

91. The product of claim 74, wherein the hydrogen peroxide of the aqueous hydrogen peroxide solution comprises about 1.85 to 2.00 wt. % of the product.

92. The product of claim 74, wherein the product further comprises one or more set retarders selected from the group consisting of sodium metaphosphate, phosphoric acid, borax, boric acid, alkali citrates, barium hydroxide, barium nitrate, barium chloride, zinc nitrate, and gypsum.

93. The product of claim 92, wherein the one or more set retarders comprise less than about 5 wt. % of the product.

94. The product of claim 92, wherein the one or more set retarders comprise about 0.5 to 2 wt. % of the product.

95. The product of claim 74, wherein the product further comprises a set retarder selected from the group consisting of borax, barium chloride, barium nitrate, and sodium metaphosphate.

96. The product of claim 74, wherein the product further comprises one or more aggregates.

97. The product of claim 96, wherein the product further comprises one or more fine aggregates having particle sizes between about 0.005 and about 10 mm, and comprise about 1 to about 25 wt. % of the product.

98. The product of claim 97, wherein the one or more fine aggregates are selected from the group consisting of fine expanded perlite, pumice, cenosphere, and hollow glass powder.

99. The product of claim 74, wherein the product further comprises one or more submicron fillers and wherein the one or more submicron fillers comprise gray and white silica fume.

100. The product of claim 99, wherein the one or more submicron fillers comprise about 1 to about 12 wt. % of the product.

101. The product of claim 99, wherein the one or more submicron fillers comprise about 1 to about 3 wt. % of the product.

102. The product of claim 74, wherein the one or more fiber materials are selected from group consisting of organic fiber, glass fiber, mineral fiber, basalt fiber, and carbon fiber.

103. The product of claim 74, wherein the one or more fiber materials comprise at least 0.20 wt. % of the product.

104. The product of claim 74, wherein the one or more fiber materials comprise about 0.25 to about 2.5 wt. % of the product.

105. The product of claim 74, wherein the product further comprises one or more accelerators selected from the group consisting of aluminum hydroxide, sodium or potassium carbonate, sodium sulfate, potassium sulfate, sodium oxalate, potassium oxalate, sodium fluoride and potassium fluoride, and wherein the one or more accelerators comprise up to about 5 wt. % of the product.

* * * * *